US009880615B2

(12) United States Patent
Sendai

(10) Patent No.: US 9,880,615 B2
(45) Date of Patent: Jan. 30, 2018

(54) INFORMATION PROCESSING DEVICE AND CONTROL METHOD FOR INFORMATION PROCESSING DEVICE

(71) Applicant: Seiko Epson Corporation, Tokyo (JP)

(72) Inventor: Kaori Sendai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 14/174,104

(22) Filed: Feb. 6, 2014

(65) Prior Publication Data

US 2014/0232641 A1   Aug. 21, 2014

(30) Foreign Application Priority Data

Feb. 15, 2013   (JP) .................................. 2013-027665
Nov. 1, 2013    (JP) .................................. 2013-228187

(51) Int. Cl.
*G09G 1/00*     (2006.01)
*G06F 3/01*     (2006.01)

(52) U.S. Cl.
CPC ................................... *G06F 3/011* (2013.01)

(58) Field of Classification Search
CPC ............... G06F 3/01; G09G 5/00; G09B 5/06
See application file for complete search history.

(56) References Cited

U.S. PATENT DOCUMENTS

| 5,712,437 A | 1/1998 | Kageyama |
| 2007/0188407 A1 | 8/2007 | Nishi |
| 2007/0195012 A1 | 8/2007 | Ichikawa et al. |
| 2010/0039351 A1 | 2/2010 | Nishi |
| 2010/0220935 A1* | 9/2010 | Kim ...................... H04N 19/119 382/232 |
| 2012/0162259 A1 | 6/2012 | Sakai |
| 2013/0021373 A1* | 1/2013 | Vaught ................. G02B 27/017 345/633 |
| 2013/0137076 A1* | 5/2013 | Perez ....................... G09B 5/06 434/308 |

FOREIGN PATENT DOCUMENTS

| JP | 08-286689 A | 11/1996 |
| JP | 03081238 U | 10/2001 |
| JP | 2005-244919 A | 9/2005 |
| JP | 2007-52224 A | 3/2007 |
| JP | 2007-256915 A | 10/2007 |
| JP | 2009-098676 A | 5/2009 |
| JP | 2010-145878 A | 7/2010 |
| JP | 2011-250100 A | 12/2011 |
| JP | 2012-074976 A | 4/2012 |
| JP | 2012-133250 A | 7/2012 |

* cited by examiner

*Primary Examiner* — Michael Faragalla
(74) *Attorney, Agent, or Firm* — ALG Intellectual Property, LLC

(57) ABSTRACT

An information processing device includes an information acquisition unit that acquires at least one of specific information regarding an environment where the information processing device is used, biological information of a user who uses the information processing device, and control information for controlling the information processing device, and a control unit that controls the information processing device on the basis of at least one of the acquired specific information, biological information, and control information.

18 Claims, 10 Drawing Sheets

INFORMATION PROCESSING DEVICE AND CONTROL METHOD FOR INFORMATION PROCESSING DEVICE

BACKGROUND

1. Technical Field

The present invention relates to an information processing device.

2. Related Art

A head mounted display (HMD) which is a display mounted on the head is known. The head mounted display generates image light representing an image by using, for example, a liquid crystal display and a light source, and guides the generated image light to user's eyes by using a projection optical system or a light guiding plate, thereby causing the user to visually recognize a virtual image. Of the head mounted display, there are two types including a transmission type in which a user can visually recognize external scenery in addition to a virtual image and a non-transmission type in which the user cannot visually recognize the external scenery. The transmission type head mounted display includes an optical transmission type display and a video transmission type display.

In the transmission type head mounted display, a technique which causes a user to visually recognize a sound as a character image indicating the sound through conversion of the sound is known. For example, JP-A-2011-250100 discloses a technique in which, when content recorded on the recording medium is visually recognized by a user of a head mounted display, sounds included in the content are divided into a person's voice and an environmental sound, a text image indicating the environmental sound is generated, and the generated text image is visually recognized by the user. In addition, JP-A-2010-145878 discloses a technique in which, in chorus practice by a singing chorus and a conductor with a head mounted display conducting the chorus, a chorus member who has a different tempo or pitch of a song is specified, and an image indicating the specified chorus member is visually recognized by the conductor. Further, JP-A-2007-52224 discloses a technique in which, in a head mounted display which allows a user to visually recognize an image, a region where only image light for an alarm such as a warning or a notification is emitted is formed, and thus the image light for the alarm can be easily and reliably visually recognized by a user.

However, in the technique disclosed in JP-A-2011-250100, a user can adjust a method of hearing an external sound different from a sound of content by adjusting the volume of the viewing content through a user's operation. However, there is a case where it is hard to hear the external sound unless the volume of the content is adjusted in a case where the volume of the content is high. In addition, it is desirable to allow an expected external sound which suddenly occurs such as in an emergency to be recognized by a user. Further, in the technique disclosed in JP-A-2010-145878, a sound source in which a tempo or pitch difference of a song occurs can be visually recognized by a user is generated, but the volume of a sound heard by the user cannot be adjusted. Furthermore, in the technique disclosed in JP-A-2007-52224, image light informs a user of a battery level or a signal strength, but, for example, it is desirable to also detect a change in an environment of the user so as to inform the user of the change. Moreover, the above-described problems are not limited to a head mounted display, and are common to a sound output device which outputs sound.

SUMMARY

An advantage of some aspects of the invention is to solve at least a part of the problems described above, and the invention can be implemented as the following forms.

(1) An aspect of the invention provides an information processing device. The information processing device includes an information acquisition unit that acquires at least one of specific information regarding an environment where the information processing device is used, biological information of a user who uses the information processing device, and control information for controlling the information processing device; and a control unit that controls the information processing device on the basis of at least one of the acquired specific information, biological information, and control information. According to the information processing device, an instruction regarding control of the information processing device can be sent to the user on the basis of any one of circumstances of the external environment, the biological information of the user, and the control information received by the information processing device. Therefore, it is possible to enable the user to recognize changes in the environment and the biological information or a faulty operation.

(2) The information processing device may further include a sound output unit that outputs a sound, and, here, the control unit may control an output sound which is output by the sound output unit. According to the information processing device, it is possible to enable the user to recognize an environmental change or a faulty operation even if the user does not perform an action such as visual recognition of a specific location. Therefore, convenience to the user improves.

(3) In the information processing device, the information acquisition unit may acquire an external sound which is different from the output sound as the specific information, and the control unit may control the output sound on the basis of the external sound. In the information processing device, since the output sound is controlled on the basis of the external sound, the user can hear the external sound while hearing output sounds of supplied content, so as to immediately recognize an external change.

(4) The information processing device may further include an image display unit that forms image light representing an image on the basis of image data so as to allow the image light to be visually recognized by the user, and allows external scenery to be transmitted therethrough; and a conversion unit that converts the external sound into a character image which indicates the external sound by text. Here, the control unit may cause the image display unit to form character image light which is the image light representing the character image. In the information processing device, the external sound acquired by the information acquisition unit can be visually recognized by the user as a character image indicating the external sound, and thus the external sound can be recognized by the user in more detail.

(5) In the information processing device, the control unit may set a size of the character image light which the image display unit allows the user to visually recognize on the basis of the external sound. According to the information processing device, a size of the character of the character image is set on the basis of the volume of an external sound. Therefore, the external sound is heard by the user, and a difference in the volume or a frequency of the external sound is also visually recognized using a size of a character of the character image, thereby enabling the external sound to be recognized in more detail.

(6) In the information processing device, the control unit may cause the image display unit to form the character image light in a part excluding a central part of an image formable region which is a region where the image display unit can form the image light. According to the information processing device, since the character image indicating the external sound is not displayed in the central part of the image formable region, a visual field of the user is not hindered more than necessary, and the user can visually recognize not only external scenery transmitted through the image display unit but also the character image. Therefore, convenience to the user improves.

(7) In the information processing device, the information acquisition unit may be provided in a plurality, the plurality of information acquisition units being disposed at different positions. Here, the information processing device may further include a sound source direction estimation unit that estimates a sound source direction which is a direction from the image display unit to a sound source of the external sound on the basis of the volume of the external sound acquired by one information acquisition unit and the volume of the external sound acquired by another information acquisition unit. In addition, the control unit may cause the image display unit to form the character image light in an image formable region which is a region where the image display unit can form the image light in correlation with the sound source direction. According to the information processing device, a character image which indicates an external sound by text is visually recognized by the user at a position close to the sound source, and thus a position of the sound source can be recognized by the user.

(8) In the information processing device, the control unit may measure the volume of the external sound and turn down the volume of the output sound when the measured volume of the external sound changes from a value smaller than a first threshold value to a value equal to or larger than the first threshold value. According to the information processing device, even if the volume of an output sound of content or the like is high, the volume of the output sound can be turned down in a case where the volume of the external sound is high. Therefore, even in a case where an external sound with high volume such as a warning sound is acquired, the external sound can be more clearly heard.

(9) The information processing device may further include a specific sound detection unit that detects a specific sound included in the external sound. Here, the control unit may control the output sound on the basis of the specific sound detected by the specific sound detection unit. According to the information processing device, the volume of the output sound is turned down when the user detects a specific sound which is desired to be detected, and thus the user can hear only a necessary sound included in an external sound. Therefore, convenience to the user improves.

(10) The information processing device may further include a motion detection unit that detects a change in a motion of the head of the user, and, here, the control unit may control the output sound on the basis of the change in a motion of the head of the user, detected by the motion detection unit. According to the information processing device, the volume or frequency of the output sound is adjusted on the basis of two indexes including a change in an external sound and a change in a visual line direction of the user. Therefore, unnecessary adjustment is suppressed, and thus convenience to the user improves as compared with a case where the volume of an output sound is adjusted only using the change in an external sound.

(11) In the information processing device, the control unit may cause the sound output unit to output a sound in which the volume of the external sound is set as the output sound on the basis of a change in the external sound. According to the information processing device, in a case where the volume of a specific sound such as a warning sound included in an external sound is detected to be lower than the volume of an output sound, the user can be allowed to hear the output sound with the volume higher than the volume of the external sound, and thus convenience to the user improves.

(12) In the information processing device, when the information acquisition unit acquires a specific person's voice, the control unit may change a frequency of the acquired voice of the specific person, and cause the sound output unit to output the specific person's voice whose frequency is changed and also turn down the volume of sounds other than the specific person's voice. According to the information processing device, in a case where a sound with a frequency which is hard for a person to hear is acquired, the acquired sound is easily heard, and thus an external sound is easily recognized.

(13) In the information processing device, the control unit may measure the volume of the external sound, and control the output sound on the basis of the measured volume of the external sound and the volume of the output sound. According to the information processing device, since the volume of the output sound is adjusted on the basis of the volume of the external sound and the volume of the output sound, the user can hear an output sound with the volume which reflects the user's intention. Therefore, convenience to the user improves.

(14) In the information processing device, the sound output unit may allow the user to hear the output sound in a state in which the sound output unit is mounted on the head of the user. According to the information processing device, since the sound output unit is mounted on the head of the user, the sound output unit hardly deviates from the ears of the user, and thus it is possible to enable the user to stably hear an output sound.

(15) In the information processing device, the change in a motion of the head may be at least one of a change amount of angular velocity and a change amount of an angle of the head of the user, and the control unit may turn down the volume of the output sound when the change in a motion of the head is a second threshold value or greater. According to the information processing device, the volume of the output sound is adjusted on the basis of two indexes including a change in an external sound and a change in a visual line direction of the user. Therefore, unnecessary adjustment is suppressed, and thus convenience to the user improves as compared with in a case where the volume of an output sound is adjusted only using the change in an external sound.

(16) The information processing device may further include an analysis unit that analyzes an intensity of each frequency in a frequency spectrum of the external sound, and, here, the control unit may control the volume of the output sound on the basis of a specific frequency of the frequency spectrum analyzed by the analysis unit. According to the information processing device, in a case where an abnormal sound of which a frequency is different is detected in an acquired external sound, the user can recognize the abnormal sound or the like, and thus convenience to the user improves.

(17) In the information processing device, the specific information may be information related to at least one of temperature, humidity, magnetism, components in the air, and attachment of liquid to the information processing device. According to the information processing device, it is possible to enable the user to recognize a control method of the information processing device on the basis of changes in the external environment of the information processing device, and thus it is possible to enable the user to immediately and intelligibly recognize dangerous circumstances in the environment.

(18) The information processing device may further include an operation unit that receives a predetermined operation as the control information, and, here, the control unit may control the information processing device when an operation different from the predetermined operation received by the operation unit is received. According to the information processing device, in a case where the predetermined operation is not performed, the user recognizes that he or she performs an operation different from the predetermined operation. Therefore, the user easily performs the predetermined operation and convenience to the user improves.

(19) In the information processing device, the information acquisition unit may acquire acceleration of the information processing device, and the specific information may be acceleration of the information processing device which is equal to or higher than a threshold value. According to the information processing device, it is possible to enable the user to recognize control information of the information processing device on the basis of changes in conditions of the user himself/herself different from changes in the environment where the information processing device is used, and thus convenience to the user improves.

(20) In the information processing device, the control unit may perform control so as to inform the user of the information processing device of information for limiting use of the information processing device. According to the information processing device, since the user is informed of the control information of the information processing device, the user can stop the use of the information processing device on the basis of changes in the external environment or a faulty operation, and thus convenience to the user improves.

(21) The information processing device may further include an image display unit that forms image light representing an image on the basis of image data so as to allow the image light to be visually recognized by the user, and allows external scenery to be transmitted therethrough; and a conversion unit that converts the setting information into a character image which indicates the setting information by text. Here, the control unit may cause the image display unit to form character image light which is the image light representing the character image. According to the information processing device, the user is allowed to visually recognize the control information of the information processing device by using a text image indicating the control information, and thus the control information can be recognized in more detail.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be realized as a device which includes one or more or all of the two constituent elements, the information acquisition unit and the control unit. In other words, this device may or may not include the information acquisition unit. Further, the device may or may not include the control unit. The information acquisition unit may acquire at least one of specific information regarding an environment where the information processing device is used, biological information of a user who uses the information processing device, and control information for controlling the information processing device. The control unit may control the information processing device, for example, on the basis of at least one of the acquired specific information, biological information, and control information. This device may be realized as, for example, an information processing device, but may be realized as devices other than the information processing device. According to such an aspect, it is possible to achieve at least one of various objects such as improvement in operability and simplification of a device, integration of devices, improvement in convenience to a user who uses a device, and the like. Some or all of the above-described technical features of each aspect of the information processing device are applicable to the device.

The invention may be realized in various aspects other than the information processing device. For example, the invention may be realized in aspects such as a sound processing device, an image display device, a head mounted display, a control method for an information processing device, a control method for a sound processing device, a control method for an image display device, a control method for a head mounted display, an information processing system, a sound processing system, an image display system, and a head mounted image display system. In addition, the invention may be realized in aspects such as: a computer program for realizing functions of an information processing system, a sound processing system, an image display device system, and a head mounted display system; a recording medium for recording the computer program thereon; and data signals which include the computer program and are embodied in carrier waves.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
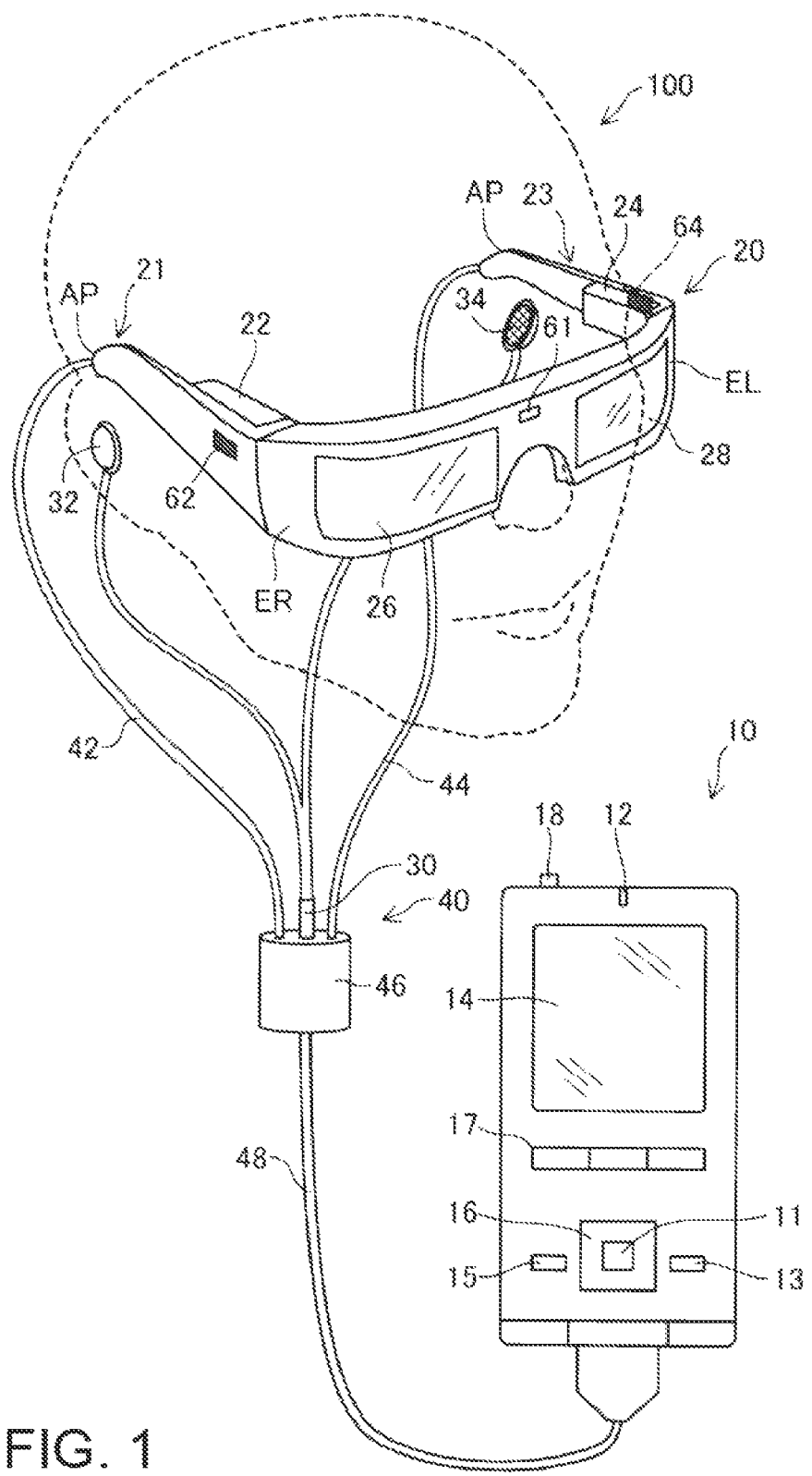
FIG. 1 is a diagram illustrating an exterior configuration of a head mounted display.

Next, embodiments of the invention will be described in the following order.
A. First Embodiment
A-1. Configuration of Head Mounted Display
A-2. Output Volume Adjustment Process
B. Second Embodiment
C. Modification Examples A. First Embodiment A-1. Configuration of Head Mounted Display FIG. 1 is a diagram illustrating an exterior configuration of a head mounted display 100. The head mounted display 100 is a display mounted on the head. The head mounted display 100 according to the present embodiment is an optical transmission type head mounted display which allows the user to visually recognize a virtual image and also to directly visually recognize external scenery. In addition, in the present specification, for convenience, a virtual image which the head mounted display 100 allows the user to visually recognize is also referred to as a "display image". Further, emitting image light which is generated on the basis of image data is also referred to as "displaying an image".

The head mounted display 100 includes an image display section 20 which allows the user to visually recognize a virtual image in a state of being mounted on the head of the user, and a control section 10 (a controller 10) which controls the image display section 20.

The image display section 20 is a mounting body which is mounted on the head of the user, and has a glasses shape in the present embodiment. The image display section 20 includes a right holding unit 21, a right display driving unit 22, a left holding unit 23, a left display driving unit 24, a right optical image display unit 26, a left optical image display unit 28, a camera 61, and microphones 62 and 64. The right optical image display unit 26 and the left optical image display unit 28 are disposed so as to be located in front of the right and left eyes of the user when the user wears the image display section 20. One end of the right optical image display unit 26 and one end of the left optical image display unit 28 are connected to each other at the position corresponding to the glabella of the user when the user wears the image display section 20.

The right holding unit 21 is a member which is provided so as to extend over a position corresponding to the temporal region of the user when the user wears the image display section 20, from an end part ER which is the other end of the right optical image display unit 26. Similarly, the left holding unit 23 is a member which is provided so as to extend over a position corresponding to the temporal region of the user when the user wears the image display section 20, from an end part EL which is the other end of the left optical image display unit 28. The right holding unit 21 and the left holding unit 23 hold the image display section 20 on the head of the user in the same manner as temples of glasses.

The right display driving unit 22 and the left display driving unit 24 are disposed at locations opposing the head of the user when the user wears the image display section 20. In addition, hereinafter, the right holding unit 21 and the left holding unit 23 are also collectively referred to as "holding units", the right display driving unit 22 and the left display driving unit 24 are also collectively referred to as "display driving units", and the right optical image display unit 26 and the left optical image display unit 28 are also collectively referred to as "optical image display units".

Figure 2:
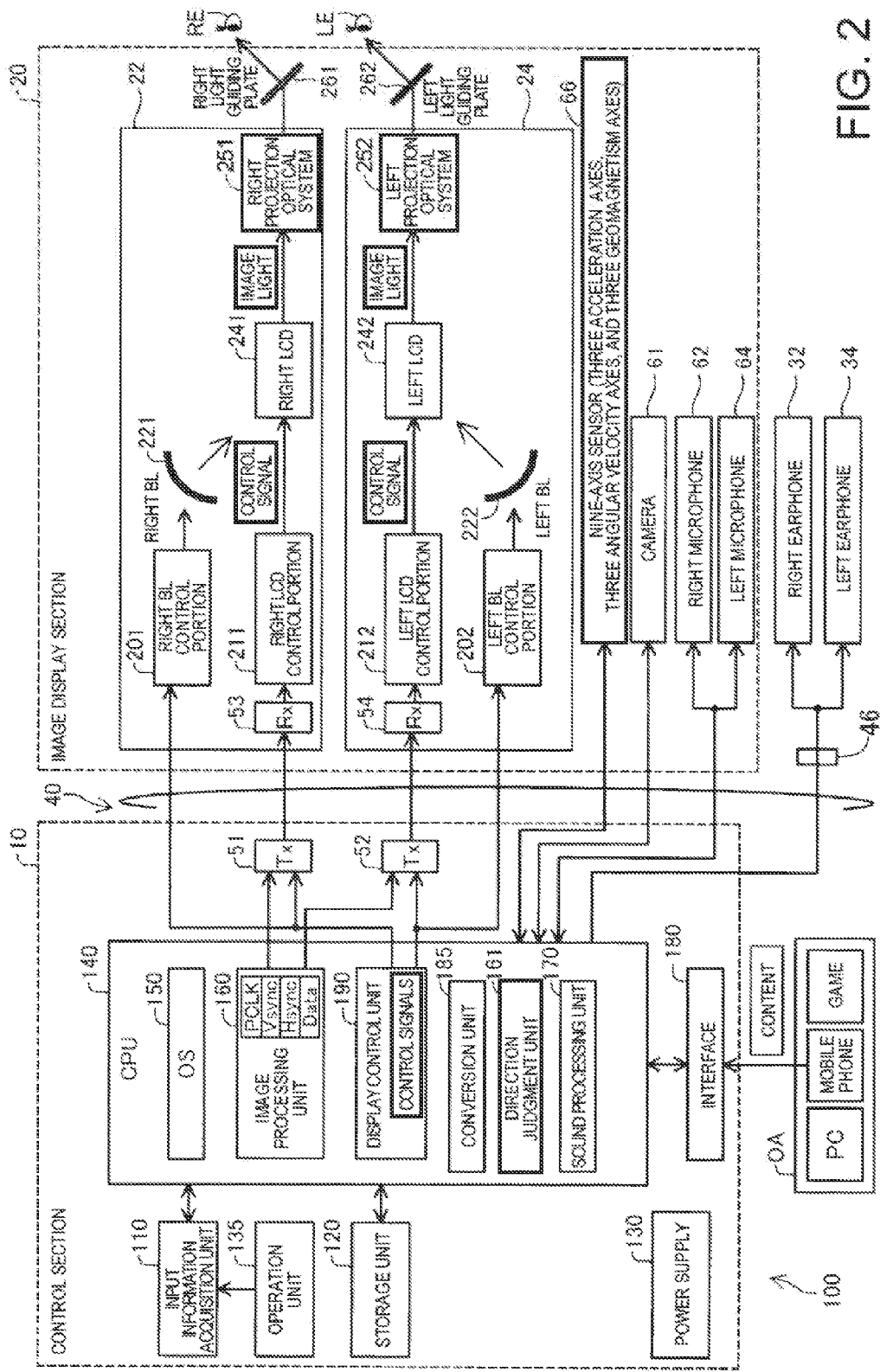
FIG. 2 is a functional block diagram illustrating a configuration of the head mounted display.

The display driving units 22 and 24 include liquid crystal displays 241 and 242 (also referred to as LCDs 241 and 242), projection optical systems 251 and 252, and the like (refer to FIG. 2). Details of configurations of the display driving units 22 and 24 will be described later. The optical image display units 26 and 28 as an optical member include light guiding plates 261 and 262 (refer to FIG. 2) and dimming plates. The light guiding plates 261 and 262 are made of a light-transmitting resin material or the like, and guide image light output from the display driving units 22 and 24 to the eyes of the user. The dimming plates are thin plate-shaped optical elements, and are disposed so as to cover a surface side of the image display section 20 opposite the eye sides of the user. The dimming plates protect the light guiding plates 261 and 262 so as to prevent the light guiding plates 261 and 262 from being damaged, polluted, or the like. In addition, light transmittance of the dimming plates is adjusted so as to adjust an amount of external light entering the eyes of the user, thereby controlling an extent of visually recognizing a virtual image. Further, the dimming plates may be omitted.

The camera 61 is disposed at the position corresponding to the glabella of the user when the user wears the image display section 20. The camera 61 acquires an image of external scenery which is an external view in a direction opposite the eye side of the user, thereby obtaining an external scenery image. The camera 61 in the present embodiment is a monocular camera, but may be a stereo camera. In addition, the user can visually recognize external scenery which is transmitted through the light guiding plates 261 and 262 of the image display section 20, separately from the external scenery image acquired by the camera 61. Further, a range of an external scenery image acquired by the camera 61 and a range of external scenery which can be visually recognized by the user through the light guiding plates 261 and 262 may be the same as or different from each other.

The right microphone 62 is disposed on a side opposite the right display driving unit 22 in the right holding unit 21. The left microphone 64 is disposed on a side opposite the left display driving unit 24 in the left holding unit 23. The right microphone 62 and the left microphone 64 are disposed at the different positions with respect to the image display section 20, and thus external volume which is the volume of an external sound acquired by the right microphone 62 is different from the external volume acquired by the left microphone 64. In addition, the term "sound" in the present specification indicates not only a person's voice but also a meaning of "sounds" in a broad sense including "mechanical noise" and the like. The right microphone 62 and the left microphone 64 correspond to a sound acquisition unit in the appended claims.

The image display section 20 further includes a connection unit 40 which connects the image display section 20 to the control section 10. The connection unit 40 includes a main body cord 48 connected to the control section 10, aright cord 42, a left cord 44, and a connection member 46. The right cord 42 and the left cord 44 are two cords into which the main body cord 48 branches out. The right cord 42 is inserted into a casing of the right holding unit 21 from an apex AP in the extending direction of the right holding unit 21, and is connected to the right display driving unit 22. Similarly, the left cord 44 is inserted into a casing of the left holding unit 23 from an apex AP in the extending direction of the left holding unit 23, and is connected to the left display driving unit 24. The connection member 46 is provided at a branch point of the main body cord 48, the right cord 42, and the left cord 44, and has a jack for connection of an earphone plug 30. A right earphone 32 and a left earphone 34 extend from the earphone plug 30. In addition, the right earphone 32 and the left earphone 34 correspond to a sound output unit in the appended claims.

The image display section 20 and the control section 10 transmit various signals via the connection unit 40. An end part of the main body cord 48 on a side opposite the connection member 46, and the control section 10 are respectively provided with connectors (not illustrated) fitted into each other. The connector of the main body cord 48 and the connector of the control section 10 are fitted into or released from each other, and thus the control section 10 is connected to or disconnected from the image display section 20. For example, a metal cable or an optical fiber may be used as the right cord 42, the left cord 44, and the main body cord 48.

The control section 10 is a device used to control the head mounted display 100. The control section 10 includes a determination key 11, a lighting unit 12, a display changing key 13, a track pad 14, a luminance changing key 15, a direction key 16, a menu key 17, and a power switch 18. The determination key 11 detects a pushing operation, so as to output a signal for determining content operated in the control section 10. The lighting unit 12 indicates an operation state of the head mounted display 100 by using a light emitting state thereof. The operation state of the head mounted display 100 includes, for example, ON and OFF of power, or the like. For example, a light emitting diode (LED) is used as the lighting unit 12. The display changing key 13 detects a pushing operation so as to output a signal for changing a content moving image display mode between 3D and 2D. The track pad 14 detects an operation of the finger of the user on an operation surface of the track pad 14 so as to output a signal based on detected content. Various track pads of a capacitance type, a pressure detection type, and an optical type may be employed as the track pad 14. The luminance changing key 15 detects a pushing operation so as to output a signal for increasing or decreasing a luminance of the image display section 20. The direction key 16 detects a pushing operation on keys corresponding to vertical and horizontal directions so as to output a signal based on detected content. The power switch 18 detects a sliding operation of the switch so as to change a power supply state of the head mounted display 100.

FIG. 2 is a functional block diagram illustrating a configuration of the head mounted display 100. As illustrated in FIG. 2, the control section 10 includes a CPU 140, an operation unit 135, an input information acquisition unit 110, a storage unit 120, a power supply 130, an interface 180, a transmission unit 51 (Tx 51), and a transmission unit 52 (Tx 52). The operation unit 135 receives an operation from the user, and is constituted by the determination key 11, the display changing key 13, the track pad 14, the luminance changing key 15, the direction key 16, the menu key 17, and the power switch 18.

The input information acquisition unit 110 acquires a signal based on an operation input by the user. The signal based on an operation input includes, for example, a signal based on an operation input for the track pad 14, the direction key 16, or the power switch 18. The power supply 130 supplies power to the respective units of the head mounted display 100. For example, a secondary battery may be used as the power supply 130. The storage unit 120 stores various computer programs. The storage unit 120 is constituted by a ROM, a RAM, and the like. The CPU 140 reads and executes the computer programs stored in the storage unit 120 so as to function as an operating system 150 (OS 150), an image processing unit 160, a sound processing unit 170, a conversion unit 185, a direction judgment unit 161, and a display control unit 190.

The image processing unit 160 acquires an image signal included in content. The image processing unit 160 separates synchronization signals such as a vertical synchronization signal VSync and a horizontal synchronization signal HSync from the acquired image signal. In addition, the image processing unit 160 generates a clock signal PCLK by using a phase locked loop (PLL) circuit or the like (not illustrated) on the basis of the separated vertical synchronization signal VSync or horizontal synchronization signal HSync. The image processing unit 160 converts an analog image signal from which the synchronization signals are separated into a digital image signal by using an A/D conversion circuit or the like (not illustrated). Next, the image processing unit 160 stores the converted digital image signal in a DRAM of the storage unit 120 for each frame as image data Data (RGB data) of a target image. Further, the image processing unit 160 may perform, on the image data, image processes including a resolution conversion process, various color tone correction processes such as adjustment of luminance and color saturation, a keystone correction process, and the like, as necessary.

The image processing unit 160 transmits each of the generated clock signal PCLK, vertical synchronization signal VSync and horizontal synchronization signal HSync, and the image data Data stored in the DRAM of the storage unit 120, via the transmission units 51 and 52. Here, the image data Data which is transmitted via the transmission unit 51 is referred to as "right eye image data", and the image data Data which is transmitted via the transmission unit 52 is referred to as "left eye image data". The transmission units 51 and 52 function as a transceiver for serial transmission between the control section 10 and the image display section 20.

The sound processing unit 170 performs various processes on an acquired external sound and an output sound which is a sound to be output. The sound processing unit 170 acquires an audio signal included in the content so as to amplify the acquired audio signal, and supplies the amplified audio signal to a speaker (not illustrated) of the right earphone 32 connected to the connection member 46 and a speaker (not illustrated) of the left earphone 34 connected thereto. In addition, for example, in a case where a Dolby (registered trademark) system is employed, the audio signal is processed, and thus different sounds of which frequencies are changed are respectively output from the right earphone 32 and the left earphone 34.

In addition, the sound processing unit 170 specifies external volume acquired by the microphones 62 and 64 and output volume which is the volume of output sounds as numerical values of decibels (dB), and detects a specific sound such as a warning sound which is included in an external sound and is stored in the storage unit 120 in advance. The detection of the specific sound included in an external sound is performed by collating a waveform of a frequency spectrum of a warning sound which is preliminarily stored in the storage unit 120 with a waveform of a frequency spectrum of an external sound which is acquired during a predetermined period. The sound processing unit 170 may also discriminate a person's voice from other sounds by collating waveforms of frequency spectra with each other. In addition, the sound processing unit 170 analyzes a frequency spectrum of an acquired external sound so as to calculate an intensity of each frequency. In the present embodiment, the sound processing unit 170 acquires external volume every second, and analyzes the external volume acquired for one second in analyzing a frequency spectrum thereof.

Further, the sound processing unit 170 adjusts output volume on the basis of whether or not external volume acquired at a certain time is equal to or higher than prescribed volume, or a change between the external volume acquired at a certain time and external volume acquired one second ago. The sound processing unit 170 adjusts an output volume on the basis of a change between a frequency spectrum of external volume acquired for one second at a certain time and a frequency spectrum of external volume acquired for the previous one second. Furthermore, the sound processing unit 170 adjusts output volume on the basis of a specific sound included in a detected external sound.

The sound processing unit 170 estimates a direction from the image display section 20 to a sound source of an external sound on the basis of external volume acquired by the right microphone 62 and external volume acquired by the left microphone 64. Specifically, in the present embodiment, in a case where volume acquired by the right microphone 62 is higher than volume acquired by the left microphone 64, the sound processing unit 170 estimates that there is a sound source to the right with respect to the user. In addition, the sound processing unit 170 corresponds to a sound control unit, an analysis unit, a specific sound detection unit, and a sound source direction estimation unit in the appended claims.

The conversion unit 185 converts sounds acquired by the microphones 62 and 64 into a character image which indicates the sounds by text. The direction judgment unit 161 specifies a change amount of angular velocity or an angle of the head of the user on the basis of a change in a motion of the image display section 20, detected by a nine-axis sensor 66 described later.

The display control unit 190 generates control signals for control of the right display driving unit 22 and the left display driving unit 24. Specifically, by using the control signals, the display control unit 190 separately controls a right LCD control portion 211 to turn on and off driving of a right LCD 241, a right backlight control portion 201 to turn on and off driving of a right backlight 221, a left LCD control portion 212 to turn on and off driving of a left LCD 242, and a left backlight control portion 202 to turn on and off driving of a left backlight 222. Accordingly, the display control unit 190 controls each of the right display driving unit 22 and the left display driving unit 24 to generate and emit image light. For example, the display control unit 190 causes both of the right display driving unit 22 and the left display driving unit 24 to generate image light, causes either thereof to generate image light, or causes neither thereof to generate image light. The display control unit 190 transmits control signals for the right LCD control portion 211 and the left LCD control portion 212 via the transmission units 51 and 52, respectively. In addition, the display control unit 190 transmits control signals for the right backlight control portion 201 and the left backlight control portion 202, respectively.

Further, the display control unit 190 sets a size of each character of a character image converted by the direction judgment unit 161 on the basis of external volume acquired by the microphones 62 and 64, and transmits a control signal representing the character image of which the size of each character is set to the image display section 20. The image display section 20 generates image light representing the character image on the basis of the transmitted control signal so as to emit the image light toward the eyes of the user, and thus the user can visually recognize the sounds as the character image.

The interface 180 is an interface which connects various external apparatuses OA which are content supply sources to the control section 10. The external apparatuses OA include, for example, a personal computer (PC), a mobile phone terminal, a gaming terminal, and the like. For example, a USB interface, a micro-USB interface, a memory card interface, and the like may be used as the interface 180.

The image display section 20 includes the right display driving unit 22, the left display driving unit 24, the right light guiding plate 261 as the right optical image display unit 26, the left light guiding plate 262 as the left optical image display unit 28, the camera 61, the nine-axis sensor 66, the right microphone 62, and the left microphone 64.

The nine-axis sensor 66 is a motion sensor which detects acceleration (in three axes), angular velocity (in three axes), and geomagnetism (in three axes). The nine-axis sensor 66 is provided in the image display section 20, and thus detects a motion of the head of the user when the image display section 20 is mounted on the head of the user. Since a direction of the image display section 20 can be recognized from the detected motion of the head of the user, the direction judgment unit 161 can estimate a visual line direction of the user. The direction judgment unit 161 and the nine-axis sensor 66 correspond to a motion detection unit in the appended claims. The microphones 62 and 64 transmit audio signals of acquired sounds to the conversion unit 185 and the sound processing unit 170.

The right display driving unit 22 includes a reception portion 53 (Rx 53), the right backlight control portion 201 (right BL control portion 201) and the right backlight 221 (right BL 221) which function as a light source, the right LCD control portion 211 and the right LCD 241 which function as a display element, and a right projection optical system 251. The right backlight control portion 201 and the right backlight 221 function as a light source. The right LCD control portion 211 and the right LCD 241 function as a display element. In addition, the right backlight control portion 201, the right LCD control portion 211, the right backlight 221, and the right LCD 241 are collectively referred to as an "image light generation portion".

The reception portion 53 functions as a receiver for serial transmission between the control section 10 and the image display section 20. The right backlight control portion 201 drives the right backlight 221 on the basis of an input control signal. The right backlight 221 is a light emitting body such as, for example, an LED or an electroluminescent element (EL). The right LCD control portion 211 drives the right LCD 241 on the basis of the clock signal PCLK, the vertical synchronization signal VSync, the horizontal synchronization signal HSync, and the right eye image data which are input via the reception portion 53. The right LCD 241 is a transmissive liquid crystal panel in which a plurality of pixels are disposed in a matrix.

The right projection optical system 251 is constituted by a collimator lens which converts image light emitted from the right LCD 241 into parallel beams of light flux. The right light guiding plate 261 as the right optical image display unit 26 reflects image light output from the right projection optical system 251 along a predetermined light path, so as to guide the image light to the right eye RE of the user. In addition, the right projection optical system 251 and the right light guiding plate 261 are collectively referred to as a "light guiding portion".

The left display driving unit 24 has the same configuration as the right display driving unit 22. The left display driving unit 24 includes a reception portion 54 (Rx 54), the left backlight control portion 202 (left BL control portion 202) and the left backlight 222 (left BL 222) which function as a light source, the left LCD control portion 212 and the left LCD 242 which function as a display element, and a left projection optical system 252. The left backlight control portion 202 and the left backlight 222 function as a light source. The left LCD control portion 212 and the left LCD 242 function as a display element. In addition, the left backlight control portion 202, the left LCD control portion 212, the left backlight 222, and the left LCD 242 are collectively referred to as an "image light generation portion". Further, the left projection optical system 252 is constituted by a collimator lens which converts image light emitted from the left LCD 242 into parallel beams of light flux. The left light guiding plate 262 as the left optical image display unit 28 reflects image light output from the left projection optical system 252 along a predetermined light path, so as to guide the image light to the left eye LE of the user. Furthermore, the left projection optical system 252 and the left light guiding plate 262 are collectively referred to as a "light guiding portion".

Figure 3:
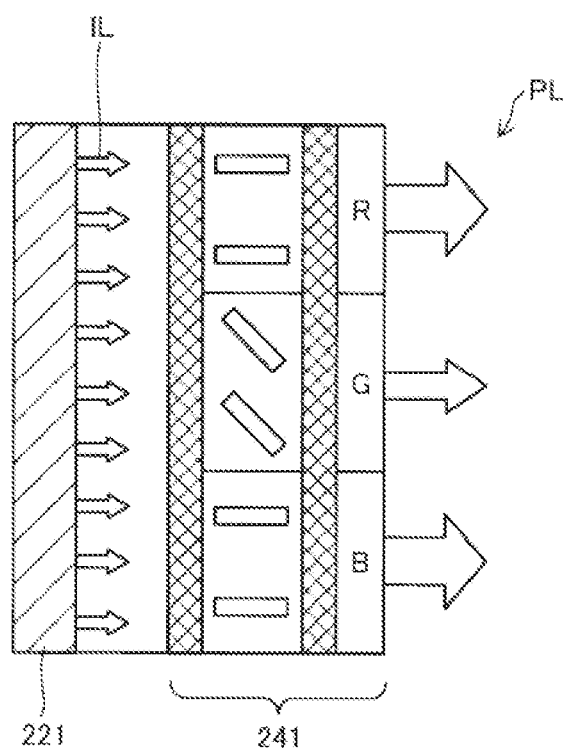
FIG. 3 is a diagram illustrating a state in which image light is generated by an image light generation portion.

FIG. 3 is a diagram illustrating a state in which image light is emitted by the image light generation portion. The right LCD 241 drives liquid crystals at respective pixel positions disposed in a matrix so as to change a transmittance of light transmitted through the right LCD 241, thereby modulating illumination light IL applied from the right backlight 221 into effective image light PL representing an image. This is also the same for the left side. In addition, as in FIG. 3, the backlight type is employed in the present embodiment, but there may be a configuration in which image light is emitted using a front light type or a reflective type.

A-2. Output Volume Adjustment Process

Figure 4:
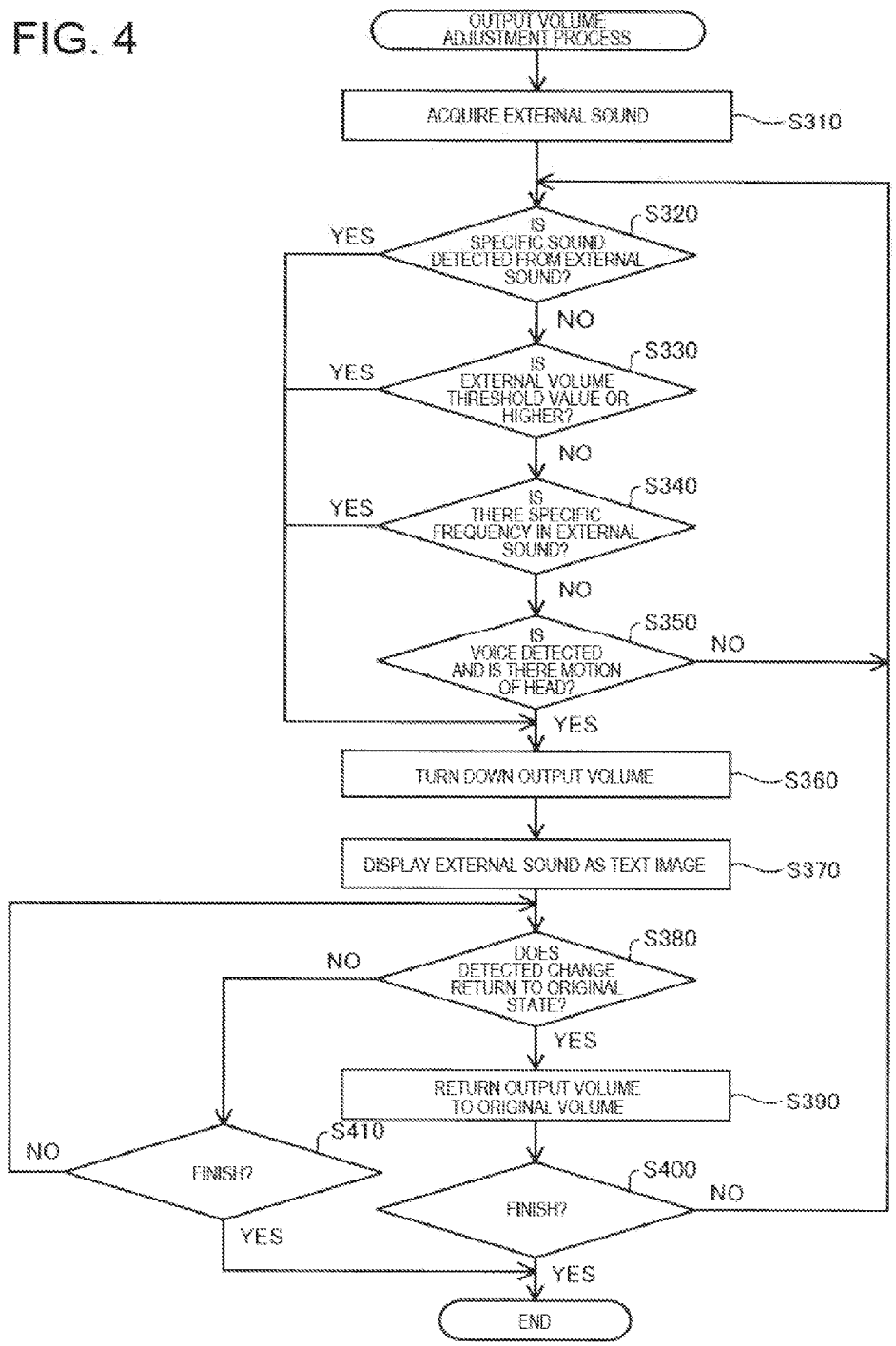
FIG. 4 is a diagram illustrating a flow of an output sound adjustment process.

FIG. 4 is a diagram illustrating a flow of an output volume adjustment process. In the output volume adjustment process, each unit of the control section 10 adjusts an output volume which is output via the earphones 32 and 34 on the basis of a change in an external sound acquired by the microphones 62 and 64. First, the microphones 62 and 64 acquire an external sound (step S310). The sound processing unit 170 performs acquisition of the volume for each second, analysis of a frequency spectrum, and detection of a specific sound on the external sound acquired by the microphones 62 and 64.

Next, the sound processing unit 170 monitors whether or not a specific sound such as a warning sound is detected from the external sound (step S320). In a case where the specific sound is detected (step S320: YES), the sound processing unit 170 turns down the output volume which is output from the earphones 32 and 34 (step S360). In the present embodiment, the sound processing unit 170 turns down output volume to a prescribed volume, but, in other embodiments, the volume which is turned down by the user may be freely set, and the volume may be set on the basis of external volume. In addition, the volume may be set on the basis of output volume and external volume.

Figure 5:
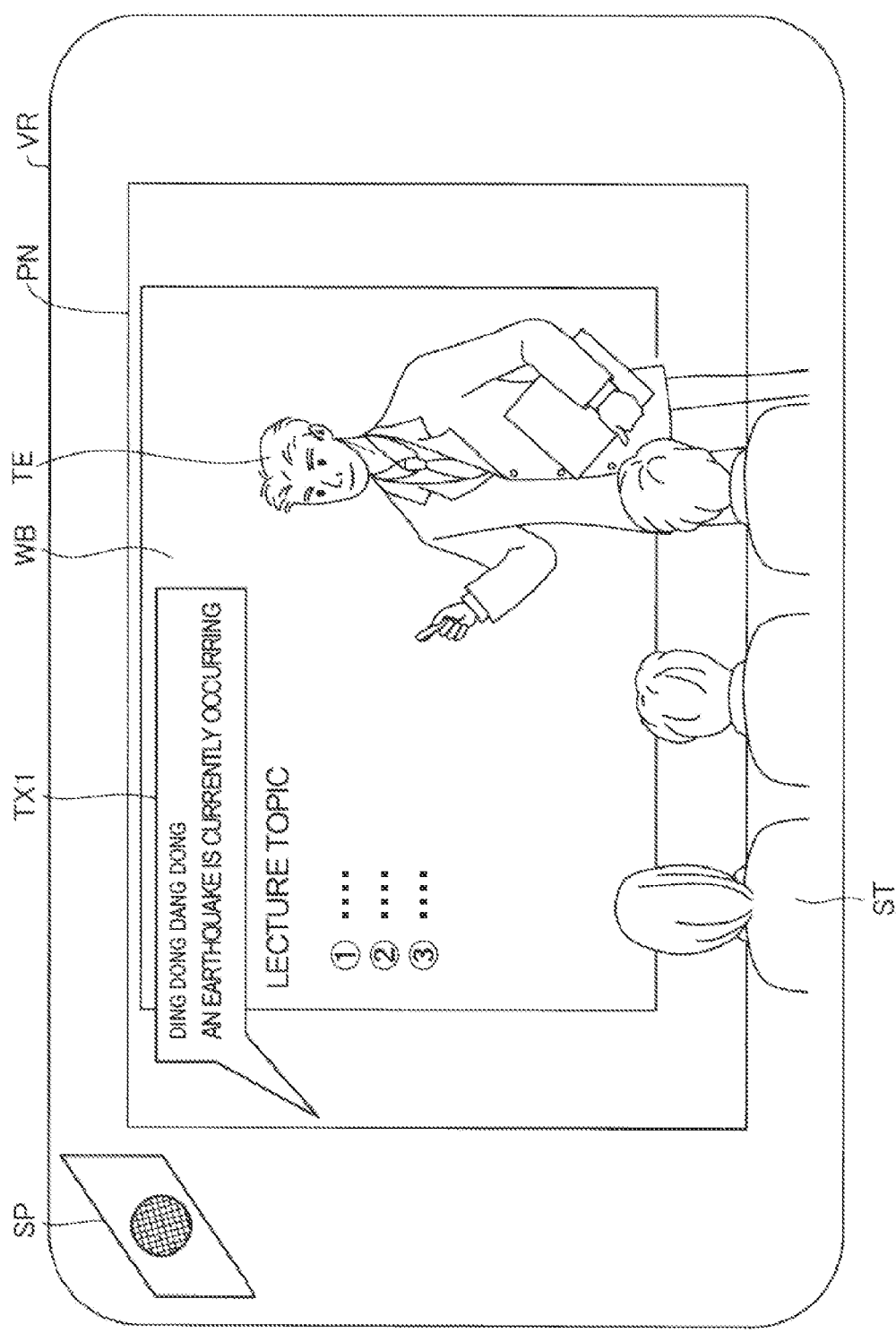
FIG. 5 is a diagram illustrating an example of a visual field recognized by a user.

When the output volume is turned down, next, the display control unit 190 displays a text image indicating the acquired external sound on the image display section 20 (step S370). FIG. 5 is a diagram illustrating an example of a visual field VR recognized by the user. FIG. 5 illustrates a visual field VR which is recognized by the user and a maximal image display region PN which is a region where the image display section 20 can display an image. As illustrated in FIG. 5, the user can visually recognize a teacher TE, a plurality of students ST who attend a lecture from the teacher TE, and a text image TX1 which indicates an acquired external sound by a character image, as external scenery. The user hears sounds, which are acquired by a lecture microphone attached to the teacher TE, as output sounds from the earphones 32 and 34 via the interface 180, and visually recognizes text which is written on a white board WB by the teacher TE. In the present embodiment, in the process in step S330, an announcement sound such as "ding dong dang dong" which sounds prior to an announcement is detected as a specific sound, and the conversion unit 185 converts the external sound acquired by the microphones 62 and 64 into a character image which indicates the external sound by text. The display control unit 190 displays the converted character image as the text image TX1 in the maximal image display region PN. The volume of the external sound "An earthquake is currently occurring" is higher than the volume of the external sound "ding dong dang dong" included in the announcement sound. For this reason, as illustrated in FIG. 5, the display control unit 190 sets a size of each character of the character image indicating "An earthquake is currently occurring" to be larger than a size of each character of the character image indicating the sound "ding dong dang dong".

The announcement sound is output from a speaker SP illustrated in FIG. 5. The left microphone 64 is closer to the speaker SP than the right microphone 62, and thus the external volume acquired by the left microphone 64 is higher than the external volume acquired by the right microphone 62. For this reason, the sound processing unit 170 judges that the speaker SP which is a sound source of the external sound is located on the left with respect to the user. The display control unit 190 displays the text image TX1 in a peripheral part which excludes a central part and occupies a left side broader than the center, in the maximal image display region PN. The maximal image display region PN in the present embodiment has 960 as the number of horizontal pixels and 540 as the number of vertical pixels. The maximal image display region PN corresponds to an image formable region in the appended claims. The part which excludes the central part in the maximal image display region PN is preferably a region excluding a region which is located at the center and has 320 as the number of horizontal pixels and 180 as the number of vertical pixels, and is more preferably a region excluding a region which is located at the center and has 480 as the number of horizontal pixels and 270 as the number of vertical pixels. In addition, in the present embodiment, the part excluding the center is simply referred to as a "peripheral part", and the part excluding the center does not necessarily indicate apart near the edge of the maximal image display region PN.

Next, the sound processing unit 170 monitors whether or not a sound output state returns to the original state in which the detected specific sound is not detected (step S380). In a case where the specific sound is not detected (step S380: YES), the sound processing unit 170 returns the output volume which is turned down in the process in step S360, to the output volume before being turned down (step S390). Next, the control section 10 monitors whether or not there is an operation for finishing the output volume adjustment process (step S400). If an operation for finishing the output volume adjustment process is not detected (step S400: NO), the sound processing unit 170 monitors again whether or not a specific sound such as a warning sound is detected from the external sound (step S320). If an operation for finishing the output volume adjustment process is detected (step S400: YES), the display control unit 190 does not display the text image TX1 which is displayed in the maximal image display region PN, and the control section 10 finishes the output volume adjustment process.

In a case where the specific sound is continuously detected in the process in step S380 (step S380: NO), the control section 10 monitors whether or not there is an operation for finishing the output volume adjustment process (step S410). If an operation for finishing the output volume adjustment process is not detected (step S380: NO), subsequently, the sound processing unit 170 monitors whether or not a sound output state returns to the original state in which the detected specific sound is not detected (step S380). If an operation for finishing the output volume adjustment process is detected (step S410: YES), the control section 10 finishes the output volume adjustment process.

Figure 6:
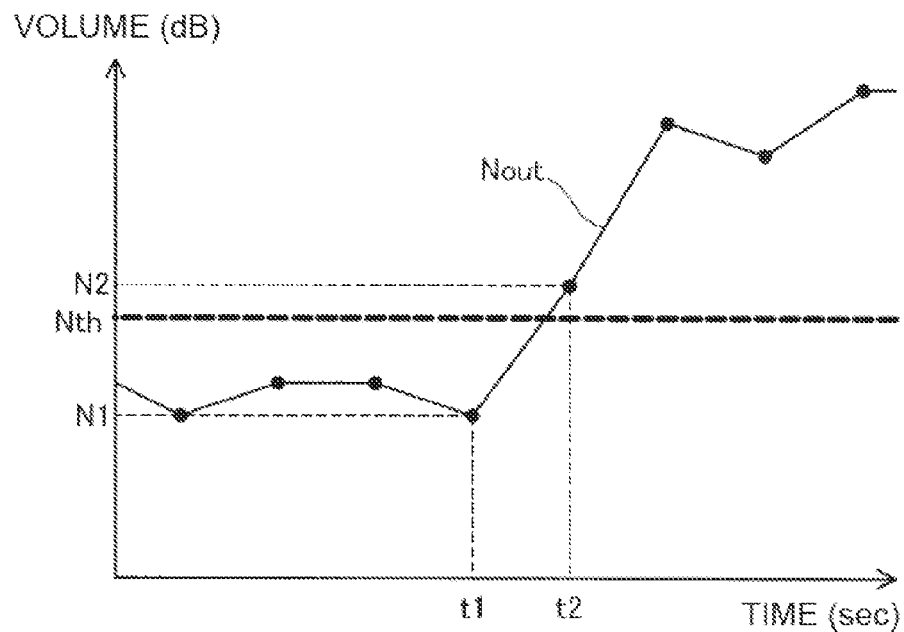
FIG. 6 is a diagram illustrating an example of a change in an acquired external sound.

In a case where the specific sound is not detected in the process in step S320 (step S320: NO), the sound processing unit 170 monitors whether or not the acquired external volume changes and is then equal to or higher than a prescribed threshold value (step S330). FIG. 6 is a diagram illustrating an example of a change in the volume of an acquired external sound. FIG. 6 illustrates a transition Nout (dB) of the volume of an external sound acquired by the microphones 62 and 64 and a prescribed volume threshold value Nth (dB). As illustrated in FIG. 6, the acquired external volume is lower than the volume threshold value Nth up to a time point t1, and becomes higher than the volume threshold value Nth at a time point t2 one second after the time point t1. In this case, the volume changes from the volume N1 at the time point t1 to the volume N2 at the time point t2. The volume N2 is equal to or higher than the volume threshold value Nth (step S330 of FIG. 4: YES), and thus each unit of the control section 10 subsequently performs the processes in and after step S360.

Figure 7:
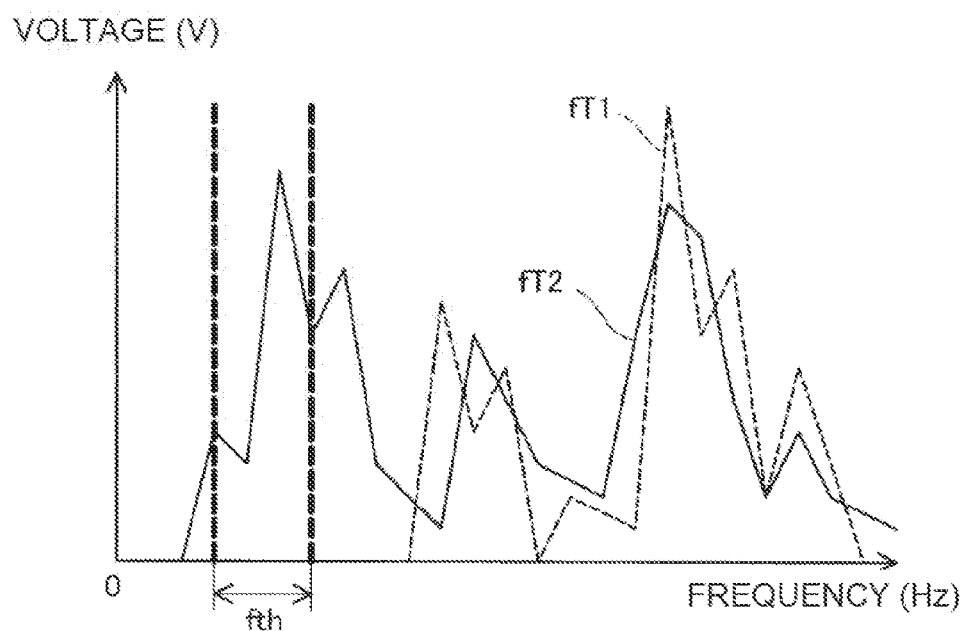
FIG. 7 is a diagram illustrating an example of a frequency of an acquired external sound.

In a case where the external volume is not changed, or the volume is lower than the volume threshold value Nth although the external volume changes in the process in step S330 (step S330: NO), the sound processing unit 170 monitors whether or not a specific frequency is detected from the external sound (step S340). FIG. 7 is a diagram illustrating an example of a frequency of an acquired external sound. FIG. 7 illustrates frequency spectra obtained by analyzing external sounds which are acquired during a period T1 and a period T2 subsequent to the period T1, respectively. As illustrated in FIG. 7, in the change from a frequency spectrum fT1 during the period T1 to a frequency spectrum fT2 during the period T2, when a frequency of a specific frequency band fth is detected (step S340: YES), each unit of the control section 10 performs the processes in and after step S360. In addition, the fact that a sound of a frequency of 3000 hertz (Hz) is easily heard by a person even if the volume thereof is low is generally known. For this reason, in other embodiments, among sounds of 20 hertz to 20000 hertz as frequencies which can be heard by a person, in relation to a sound of a frequency close to 20 hertz or 20000 hertz, an output sound may have low volume even if external sounds have the same volume.

In a case where a specific frequency is not detected from the external sound in the process in step S340 (step S340: NO), the direction judgment unit 161 monitors whether or not a motion of the head of the user is detected in a state in which the external sound changes, and a person's voice is detected from the external sound (step S350). In a state in which the sound processing unit 170 detects a person's voice from the external sound, if the direction judgment unit 161 detects that at least one of change amounts of angular velocity and of an angle of the head is equal to or larger than a prescribed threshold value (step S350: YES), each unit of the control section 10 performs the processes in and after step S360. In the process in step S350, in a case where a person's voice is not detected or a change amount of a motion of the head which is equal to or larger than the threshold value is not detected (step S350: NO), the sound processing unit 170 monitors again whether or not a specific sound such as a warning sound is detected from the external sound (step S320).

As described above, in the head mounted display 100 according to the present embodiment, the sound processing unit 170 adjusts the volume of output sounds which are output from the earphones 32 and 34 on the basis of a change in an external sound acquired by the microphones 62 and 64. For this reason, in the head mounted display 100, since the volume of the output sounds is turned down when the volume or the like of the external sound changes, the user can hear the external sound while hearing sound of content supplied via the interface 180, so as to immediately recognize an external change.

In addition, in the head mounted display 100 according to the present embodiment, the conversion unit 185 converts a sound acquired by the microphones 62 and 64 into a character image which indicates the sound by text. The display control unit 190 transmits a control signal representing the character image to the image display section 20, and image light representing the character image is generated by the image display section 20. Therefore, in the head mounted display 100, an external sound acquired by the microphones 62 and 64 can be visually recognized by the user as the text image TX1 indicating the external sound, and thus the external sound can be recognized by the user in more detail.

Further, in the head mounted display 100 according to the present embodiment, the display control unit 190 sets a size of a character in a character image on the basis of external volume acquired by the microphones 62 and 64, and transmits a control signal representing the character image in which a size of the character is set, to the image display section 20. For this reason, in the head mounted display 100, a size of the character of the text image TX1 is set on the basis of the volume of an external sound. Therefore, the external sound is heard by the user, and a difference in external volume is also visually recognized using a size of a character of the text image TX1, thereby enabling the external sound to be recognized in more detail.

In addition, in the head mounted display 100 according to the present embodiment, the display control unit 190 displays the text image TX1 in the peripheral part excluding the central part of the maximal image display region PN which is a region where the image display section 20 can display an image. For this reason, in the head mounted display 100, since a character image indicating an external sound is not displayed in the central part of the maximal image display region PN, the visual field VR of the user is not hindered more than necessary, and the user can visually recognize not only external scenery transmitted through the image display section 20 but also the character image. Therefore, convenience to the user improves.

In addition, in the head mounted display 100 according to the present embodiment, the right microphone 62 and the left microphone 64 are disposed at different positions in the image display section 20. The sound processing unit 170 estimates a direction from the image display section 20 to a sound source of an external sound on the basis of external volume acquired by the right microphone 62 and external volume acquired by the left microphone 64. The sound processing unit 170 estimates that the speaker SP is located on the left side with respect to the user, and displays the text image TX1 in a part which occupies a broader left side than the center in the maximal image display region PN. For this reason, in the head mounted display 100, a character image which indicates an external sound by text is visually recognized at a position close to the sound source in the visual field VR of the user, and thus a position of the sound source can be recognized by the user.

In addition, in the head mounted display 100 according to the present embodiment, the sound processing unit 170 turns down the output volume when the acquired volume changes from the volume N1 which is lower than the volume threshold value Nth to the volume N2 which is equal to or higher than the volume threshold value Nth. For this reason, in the head mounted display 100, even if the volume of a sound of content is high, output volume can be turned down in a case where external volume is high. Therefore, even in a case where an external sound with high volume such as a warning sound is acquired, the external sound can be more clearly heard.

Further, in the head mounted display 100 according to the present embodiment, the sound processing unit 170 detects a specific sound such as a warning sound included in an acquired external sound, and adjusts an output sound on the basis of the detected specific sound included in the external sound. For this reason, in the head mounted display 100, the output volume is turned down when the user detects a specific sound which is desired to be detected, and thus the user can hear only a necessary sound included in an external sound. Therefore, convenience to the user improves.

Further, in the head mounted display 100 according to the present embodiment, the nine-axis sensor 66 detects a motion of the head of the user, and the direction judgment unit 161 specifies a change amount of angular velocity or an angle of the head of the user on the basis of a detected change in a motion of the image display section 20. The sound processing unit 170 turns down output volume on the basis of a person's voice included in an external sound and a change amount which is equal to or larger than a prescribed threshold value in a motion of the head of the user. For this reason, in the head mounted display 100, output volume is adjusted on the basis of two indexes including a change in an external sound and a change in a visual line direction of the user. Therefore, unnecessary adjustment is suppressed, and thus convenience to the user improves as compared with a case where output volume is adjusted only using the change in an external sound.

In addition, in the head mounted display 100 according to the present embodiment, the sound processing unit 170 analyzes a frequency spectrum of an acquired external sound so as to calculate an intensity of each frequency, and adjusts output volume on the basis of a change in the analyzed frequency spectrum of the external sound. For this reason, in the head mounted display 100, in a case where an abnormal sound of which a frequency is different is detected from an acquired external sound, the user can recognize the abnormal sound or the like, and thus convenience to the user improves.

B. Second Embodiment

Figure 8:
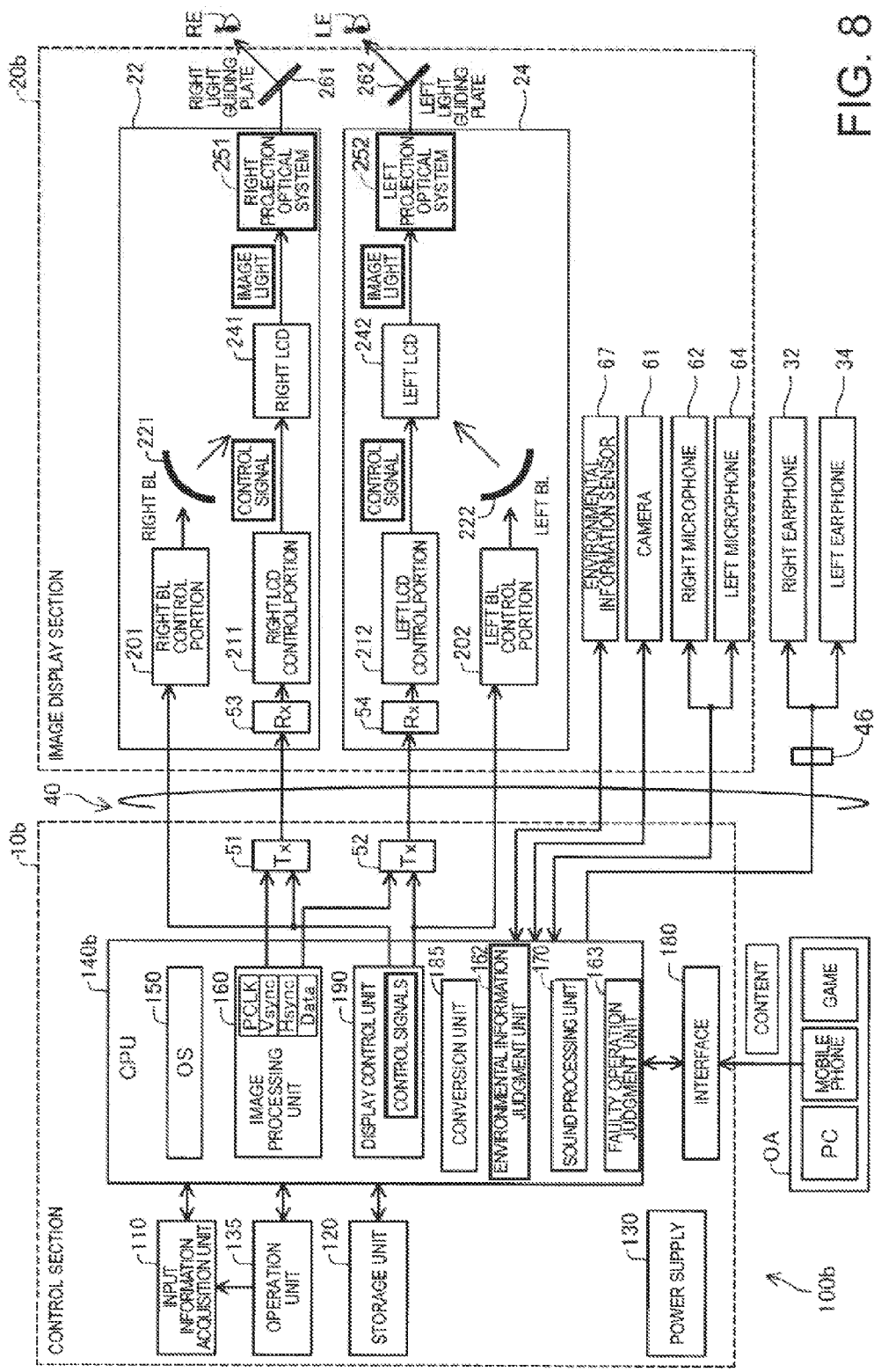
FIG. 8 is a functional block diagram illustrating a configuration of a head mounted display according to a second embodiment.

FIG. 8 is a functional block diagram illustrating a configuration of a head mounted display 100b according to the second embodiment. As illustrated in FIG. 8, in the second embodiment, an environmental information sensor 67 is provided instead of the nine-axis sensor 66 in an image display section 20b according to the present embodiment, and a CPU 140b of a control section 10b includes an environmental information judgment unit 162 and a faulty operation judgment unit 163 instead of the direction judgment unit 161.

The environmental information sensor 67 detects an external temperature as information regarding an environment where the head mounted display 100b is used. The environmental information judgment unit 162 compares the detected external temperature with a prescribed threshold value. The faulty operation judgment unit 163 judges whether or not an operation received by the operation unit 135 is the same as a predetermined operation for control of the head mounted display 100b. In a case where a result compared by the environmental information judgment unit 162 and a result of the operation judged by the faulty operation judgment unit 163 indicate a predetermined result, prescribed information is transmitted to the conversion unit 185 and the sound processing unit 170 in order to enable the user to recognize information of advice or the like based on a predetermined result. The conversion unit 185 converts the information transmitted from the environmental information judgment unit 162 into a character image which indicates the information by text. The sound processing unit 170 converts the information transmitted from the environmental information judgment unit 162 into an audio signal which is then transmitted to the microphones 62 and 64. In addition, at least one of the environmental information sensor 67 and the operation unit 135 according to the second embodiment corresponds to an information acquisition unit in the appended claims.

Figure 9:
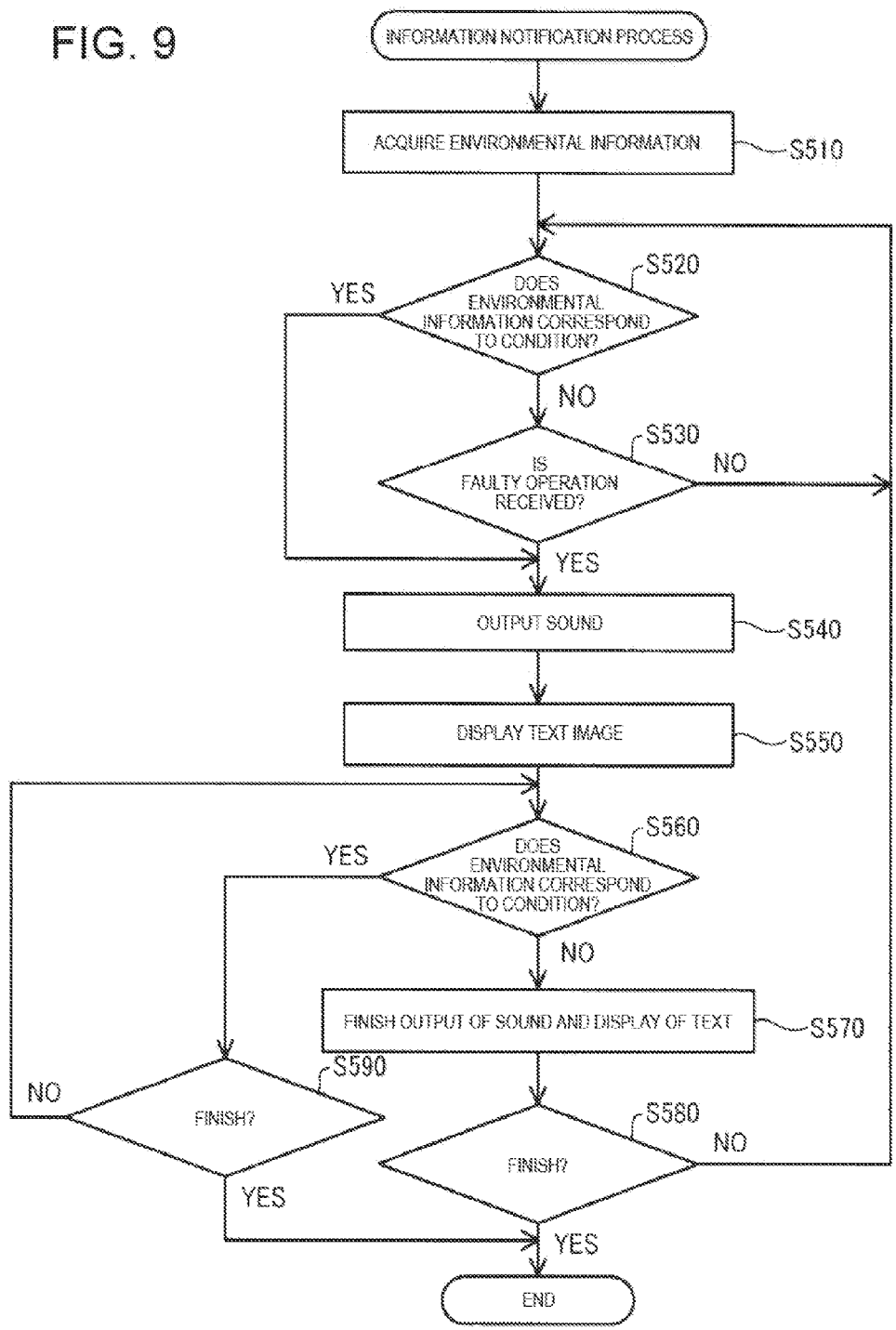
FIG. 9 is a diagram illustrating a flow of an information notification process according to the second embodiment.

FIG. 9 is a diagram illustrating a flow of an information notification process according to the second embodiment. The information notification process is a process of notifying a user of detected environmental information, or information of advice or the like when an operation judged as a faulty operation is received by the operation unit 135, by using a sound or a text image.

In the information notification process, first, the environmental information judgment unit 162 acquires an external temperature as environmental information (step S510). Next, the environmental information judgment unit 162 judges whether or not the acquired external temperature corresponds to a preset condition (step S520). In the second embodiment, a case where an external temperature is equal to or higher than 40° C. and a case where an external temperature is equal to or lower than −10° C. are set as the preset conditions. If an external temperature does not correspond to the conditions (step S520: NO), the faulty operation judgment unit 163 judges whether or not the operation unit 135 receives a faulty operation different from a predetermined operation for operating the head mounted display 100b (step S530). For example, in a case where one of a plurality of options displayed in the maximal image display region PN is selected, the faulty operation is an operation in which it is natural that the track pad 14, the direction key 16, and the determination key 11 should be operated, but other keys are selected, or the determination key 11 is continuously struck a predetermined number of times or more within a predetermined period of time. In a case where it is judged that the faulty operation is not received by the operation unit 135 (step S530: NO), subsequently, the environmental information judgment unit 162 monitors whether or not the external temperature corresponds to the preset condition (step S520).

In a case where the faulty operation is received by the operation unit 135 (step S530: YES), or the external temperature corresponds to the preset condition (step S520: YES), the sound processing unit 170 causes the microphones 62 and 64 to output a sound of this detected content (hereinafter, simply referred to as "advice") on the basis of the information transmitted from the environmental information judgment unit 162 or the faulty operation judgment unit 163 (step S540). In other words, the microphones 62 and 64 output a sound for limiting the use of the head mounted display 100b. Next, the display control unit 190 displays a text image indicating the advice which is converted by the conversion unit 185 on the basis of the information transmitted from the environmental information judgment unit 162 or the faulty operation judgment unit 163, on the image display section 20b (step S550).

Figure 10:
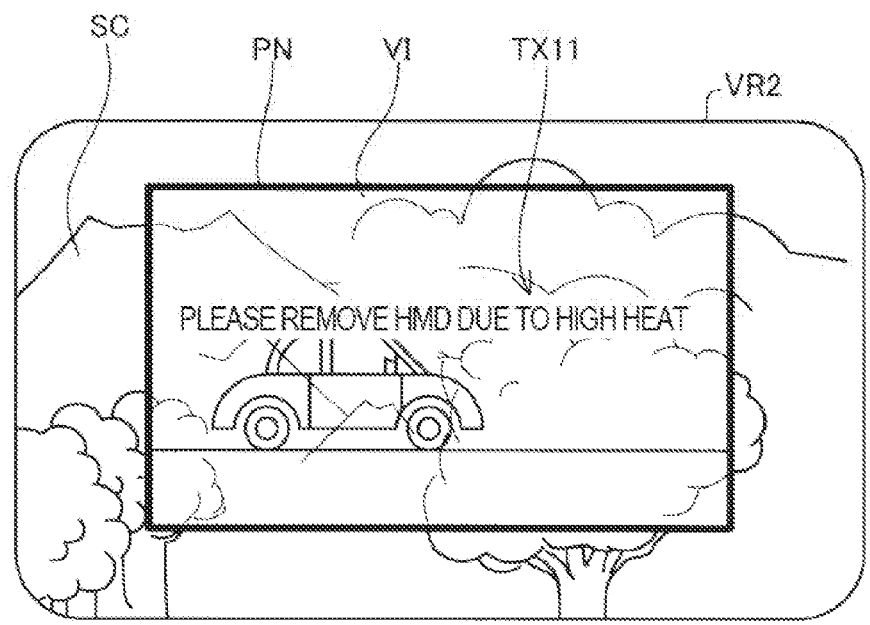
FIG. 10 is a diagram illustrating an example of a visual field recognized by a user.

FIG. 10 is a diagram illustrating an example of a visual field VR2 recognized by the user. In FIG. 10, 45° C. corresponding to the preset condition is detected as an external temperature, and a text image TX11, "Please remove the HMD due to high heat", giving advice to remove the head mounted display 100b, is visually recognized by the user. As illustrated in FIG. 10, the user visually recognizes external scenery SC and a display image VI displayed in the maximal image display region PN. The user can visually recognize the transmitted external scenery SC in the maximal image display region PN. The display image VI is a content moving image in which a car is traveling. The display image VI includes the text image TX11. In addition, the text image TX11 is displayed in the maximal image display region PN, and the microphones 62 and 64 repeatedly output the sound "Please remove the HMD due to high heat", giving the user advice at each predetermined interval of time.

When the sound of the same content as the text image TX11 is output from the microphones 62 and 64 (step S540 of FIG. 9), and the text image TX11 is displayed in the maximal image display region PN (step S550), the environmental information judgment unit 162 and the faulty operation judgment unit 163 judge whether or not at least one of the environmental information and an operation received by the operation unit 135 continues to correspond to the condition (step S560). For example, in a case where it is judged that an external temperature is lower than 40° C. and higher than −10° C. (step S560: NO), the sound processing unit 170 and the microphones 62 and 64 finish output of the sound of advice, and the display control unit 190 does not display the text image TX11 (step S570). Subsequently, the control section 10b monitors whether or not there is an operation for finishing the information notification process (step S580).

In a case where at least one of the environmental information and the operation received by the operation unit 135 continues to correspond to the condition in the process in step S560 (step S560: YES), the control section 10b monitors whether or not there is an operation for finishing the information notification process (step S590).

As described above, in the head mounted display 100b according to the second embodiment, the environmental information sensor 67 detects an external temperature as information regarding an environment where the head mounted display 100b is used, and the operation unit 135 receives a predetermined operation for control of the head mounted display 100b. The environmental information judgment unit 162 of the control section 10b performs outputting of the sound of advice and displaying of the text image TX11 in a case where a detected external temperature corresponds to the preset condition, or the faulty operation judgment unit 163 of the control section 10b performs outputting of a sound of advice and displaying of the text image TX11 in a case where the operation unit 135 receives a faulty operation. For this reason, in the head mounted display 100b according to the second embodiment, an instruction regarding control of the head mounted display 100b, such as advice, can be sent to the user on the basis of circumstances of the external environment or operation content received by the head mounted display 100b, and thus it is possible to enable the user to recognize an environmental change or a faulty operation.

In addition, in the head mounted display 100b according to the second embodiment, the environmental information judgment unit 162 or the faulty operation judgment unit 163 of the control section 10b output a sound of advice by using the sound processing unit 170 and the microphones 62 and 64. For this reason, in the head mounted display 100b according to the second embodiment, it is possible to enable the user to recognize an environmental change or a faulty operation even if the user does not perform an action such as visual recognition of a specific location. Therefore, convenience to the user improves.

Further, in the head mounted display 100b according to the second embodiment, in a case where the operation unit 135 receives a faulty operation different from a predetermined operation for operating the head mounted display 100b, the faulty operation judgment unit 163 performs outputting of a sound of advice and displaying of the text image TX11 in the maximal image display region PN. For this reason, in the head mounted display 100b according to the second embodiment, in a case where a formal operation is not performed, the user is allowed to recognize that the user performs a faulty operation. Therefore, the user easily performs a formal operation, and convenience to the user improves.

In addition, in the head mounted display 100b according to the second embodiment, the sound processing unit 170 and the display control unit 190 of the control section 10b output advice on a limitation of the use of the head mounted display 100b to the user as a sound and display the advice as the text image TX11 in the maximal image display region PN. For this reason, in the head mounted display 100b according to the second embodiment, the user can be notified of information regarding control of the head mounted display 100b, and thus the user can stop using the head mounted display 100b on the basis of a change in the external environment or a faulty operation. Therefore, convenience to the user improves.

In addition, in the head mounted display 100b according to the second embodiment, the conversion unit 185 coverts advice or the like into a character image which indicates the advice or the like by text. The display control unit 190 transmits a control signal representing the character image to the image display section 20, and image light representing the character image is generated by the image display section 20. For this reason, in the head mounted display 100*b*, it is possible to enable the user to visually recognize the advice or the like as the text image TX11 indicating the advice or the like, and thus the user can recognize the advice or the like in more detail.

C. Modification Examples

In addition, the invention is not limited to the above-described embodiments, and can be implemented in various aspects within the scope without departing from the spirit thereof. For example, the following modifications are possible.

C1. Modification Example 1

Figure 11:
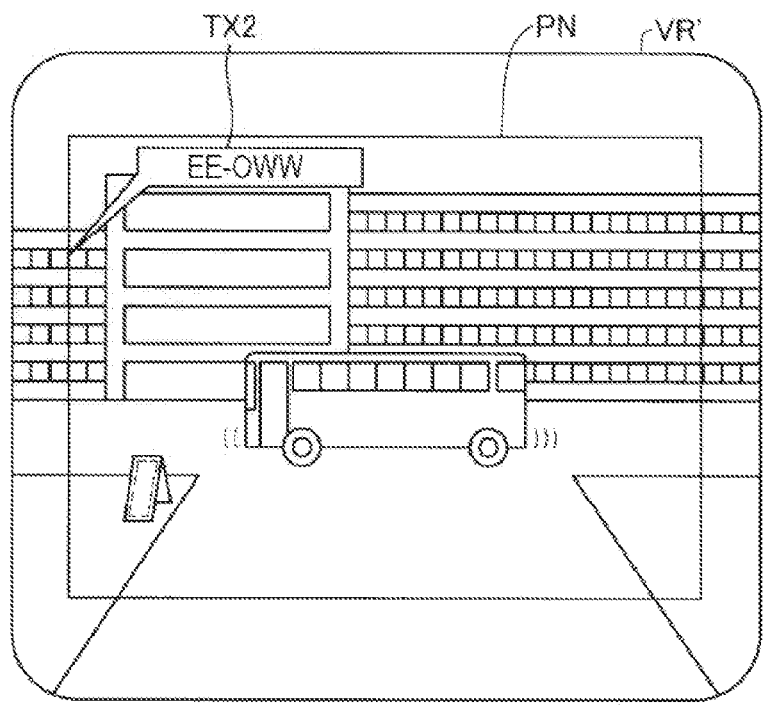
FIG. 11 is a diagram illustrating an example of a visual field recognized by a car driver.

In the above-described embodiments, the head mounted display 100 including the sound processing unit 170 and the image display section 20 has been described as an example, but a device including the sound processing unit 170 and the image display section 20 may have various modifications. FIG. 11 is a diagram illustrating an example of a visual field VR' recognized by a car driver. In this Modification Example, as illustrated in FIG. 11, a head-up display (HUD) which is formed on a windshield of the car is used as an image display device which causes the driver driving the car to visually recognize a character image. A car audio system mounted in the car, and microphones which are installed on front, rear, left and right sides of the outside of the car and acquire an external sound are used as a sound processing device.

FIG. 11 illustrates the maximal image display region PN, and a text image TX2 which indicates an acquired external sound by a character image and is displayed in the maximal image display region PN. The driver is in a state of hearing music with the car audio system mounted in the car. A sound source of an external sound acquired by the microphones is an ambulance (not illustrated) which is estimated to be located left forward from the car on the basis of the volume acquired by a plurality of microphones. In this Modification Example, if external volume is changed from a value smaller than the volume threshold value to the volume threshold value Nth or higher due to a sound (ee-oww illustrated in FIG. 11) emitted by the ambulance, a sound processing unit 170' which adjusts the volume of the car audio system turns down the volume of the music generated by the car audio system. In addition, the display control unit 190 displays a text image TX2 which is a character image indicating the sound emitted by the ambulance starts, in the maximal image display region PN. The text image TX2 is displayed in the upper left peripheral part of the maximal image display region PN. Further, there may be an aspect in which the text image TX2 is not displayed, and only the volume generated by the car audio system is turned down. For this reason, in this Modification Example, when a certain abnormality occurs outside the car, the abnormality is easily recognized by the car driver, and convenience to the user improves.

In addition, in the above-described embodiments, the image display section which can display an acquired external sound as a character image is provided, but the image display section is not an essential constituent element, and an aspect of a sound processing device may have various modifications. For example, the sound processing device may be a portable music reproduction device which can reproduce music content. In a case where a user of the portable music reproduction device hears output sounds of music content with closed type earphones, an external sound may be acquired by a microphone provided in the portable music reproduction device, and the volume of an output sound may be set on the basis of a change in the external sound.

Further, in the above-described embodiment, the sound processing unit 170 performs adjustment for turning down an output sound on the basis of a change in an acquired external sound, but adjustment for turning up the output sound may be performed. For example, in a case where a user can hear both an output sound and an external sound, the sound processing unit 170 performs adjustment for turning up output volume or turning down the output volume on the basis of a difference between external volume and the output volume. In this Modification Example, since the output volume is adjusted on the basis of a difference between the external volume and the output volume, the user can hear an output sound with the volume which reflects the user's intention. Therefore, convenience to the user improves.

C2. Modification Example 2

In the above-described embodiments, the volume of an output sound is adjusted on the basis of a change in an external sound, but the adjustment of the output volume may have various modifications. For example, the sound processing unit 170 may set the volume of an external sound acquired by the microphones 62 and 64 so as to output the external sound from the earphones 32 and 34 as an output sound. In this Modification Example, in a case where the volume of a specific sound such as a warning sound included in an external sound is detected to be lower than the volume of an output sound, a user can be allowed to hear the output sound with the volume higher than the external volume, and thus convenience to the user improves.

C3. Modification Example 3

In addition, in the above-described embodiments, the display control unit 190 sets a position at which the text image TX1 is displayed in the maximal image display region PN in correlation with a direction from the image display section 20 to a sound source of an external sound, but the position at which the text image TX1 is displayed in the maximal image display region PN may have various modifications. For example, there may be an aspect in which only one microphone is disposed in the head mounted display 100, and a direction of a sound source of an external sound is not specified. Further, even if a direction of a sound source of an external sound can be specified, the display control unit 190 may set a position at which the text image TX1 is displayed in the maximal image display region PN regardless of the direction of the sound source of the external sound.

In addition, a size of each character of a character image displayed in the maximal image display region PN and a size setting method may have various modifications. The display control unit 190 may display each character of a character image at a prescribed size in the maximal image display region PN regardless of output volume. Further, a size of each character of a character image displayed in the maximal image display region PN may be set on the basis of a frequency, the kind of sound, and a change amount of a motion of the head of a user. Furthermore, a font of a character may be changed regardless of only a size of the character.

C4. Modification Example 4

In the above-described embodiments, a character image which is displayed in the maximal image display region PN and indicates an external sound is displayed in a prescribed aspect, but a method of setting a displayed character image may have various modifications. In a case where a user hears an output sound, a predetermined operation may be performed on the operation unit 135, and thus a character image indicating the external sound may be displayed as a character image different from one before the operation is performed.

In addition, in the above-described embodiments, the microphones 62 and 64 are disposed at the positions near both of the ears of the user when the user wears the image display section 20, but an arrangement and a structure of the microphones 62 and 64 are not limited thereto and may have various modifications. For example, the microphones 62 and 64 may be microphones which have a mechanical structure so that directions thereof can be changed with respect to the image display section 20 and have directivity. In a case where a direction from the image display section 20 to a sound source of an external sound can be estimated, the sound processing unit 170 can acquire an external sound in more detail by changing the directions of the microphones 62 and 64, and thus a change in an external sound is easily detected.

In addition, in the above-described embodiments, the sound processing unit 170 detects a change in an external sound by a frequency of the external sound, and thus detection of a specific sound included in the external sound may have various modifications. For example, even in a case of an external sound including voices of a plurality of people, the sound processing unit 170 may recognize and identify a voice of each person. In this case, there may be an aspect in which the sound processing unit 170 adjusts external volume when detecting a voice of a prescribed specific person.

In addition, in the above-described embodiment, a specific sound included in an external sound is detected, thereby adjusting output volume, but a specific word may be detected, thereby adjusting output volume. For example, from the viewpoint of privacy protection, there may be an aspect in which output volume is turned up in relation to specific words, so that the specific words cannot be heard by a user. Further, there may be an aspect in which specific words such as a personal name are registered in advance, and the registered words are not converted into a character image even if a sound thereof is acquired. Furthermore, in the same manner as for the aspect in which an acquired external sound is converted into a character image indicating the external sound, there may be an aspect in which specific words are not displayed as a character image in the image display section 20.

C5. Modification Example 5

In addition, in the above-described embodiments, an output sound is controlled on the basis of a change in an external sound, but the output sound may be controlled on the basis of the external sound. For example, in a state in which an external sound is almost never acquired, control may be performed so that the volume of an output sound is turned down even if there is no change in the volume or the frequency of an external sound. In this Modification Example, since an output sound is controlled even if an acquired external sound does not change, a user can hear an output sound with appropriate volume and frequency.

Further, in a case where the camera 61 acquires a prescribed person's voice, there may be an aspect in which the sound processing unit 170 changes a frequency of the acquired voice of the person so as to output the person's voice with the changed frequency as an output sound of the earphones 32 and 34, and turns down output volume other than the person's voice with the changed frequency. In this Modification Example, in a case where a sound with a frequency which is hard for a person to hear is acquired, the acquired sound is easily heard, and thus an external sound is easily recognized by the user. Furthermore, in a case where external sounds with the substantially same frequency are acquired from a plurality of sound sources, frequencies of the external sounds acquired from several sound sources may be changed, and the external sounds with the changed frequencies may be output from the earphones 32 and 34. Generally, when a plurality of sounds with frequencies close to each other are acquired, it is hard for a person to hear a sound with a low frequency due to frequency masking. For this reason, in this Modification Example, influence of the frequency masking is suppressed, and thus a user easily recognizes sounds acquired from a plurality of sound sources.

C6. Modification Example 6

In the second embodiment, an external temperature is detected by the environmental information sensor 67 as information regarding an environment where the head mounted display 100b is used, but detected environmental information is not limited thereto and may have various modifications. The detected environmental information may be, for example, humidity, magnetism, components in the air, or an extent of wetting of the head mounted display 100b. Humidity may be measured by a humidity sensor, or an intensity of magnetism or the like may be measured by a magnetic sensor. In addition, as the components in the air, carbon monoxide in the air may be measured by a carbon monoxide analyzer, and particulate matter (for example, PM2.5) included in the air may be measured by a concentration measurement device. Further, a sensor which detects water droplets may be provided in the image display section 20b in a direction (hereinafter, simply referred to as "outwardly") opposite to a direction toward a user when the user wears the image display section 20b, so as to detect attachment of liquid to the image display section 20b. The sensor which detects water drops may emit infrared rays to the outside of the image display section 20b so as to detect reflected light which is changed depending on the presence or the absence of water drops, thereby detecting the presence or the absence of water drops. In the head mounted display 100b of this Modification Example, it is possible to give a user advice on the basis of changes in the external environment of the head mounted display 100b, and thus it is possible to enable the user to immediately and intelligibly recognize, for example, dangerous circumstances of the environment.

In addition, the environmental information sensor 67 may detect light of a specific wavelength as environmental information. Ultraviolet rays of a wavelength range of 200 nanometers (nm) to 440 nm may be detected by an ultraviolet-ray intensity meter, thereby giving a user advice on tanning or the like. Further, when cesium (Cs) of a predetermined threshold value or greater is detected by a radiation detector, advice on radiation may be given to the user.

In addition, advice may be given to a user depending on a change in the control section 10 itself or the image display section 20 itself of the head mounted display 100. For example, when the nine-axis sensor 66 of the image display section 20 detects acceleration of a predetermined threshold value or higher, the control section 10 may give the user advice by using a sound or an image. In the head mounted display 100 of this Modification Example, advice can be given to the user on the basis of changes in circumstances of the user himself/herself different from changes in the environment where the head mounted display 100 is used, and thus convenience to the user improves.

Further, biological information such as the body temperature or the blood pressure of a user may be detected using a sensor provided in the image display section 20 or the control section 10, and advice or the like may be given to the user on the basis of the detected biological information. For example, in this Modification Example, a piezoelectric blood pressure sensor which detects a blood pressure of the user is provided in a part where the right display driving unit 22 or the left display driving unit 24 of the image display section 20 is in contact with the temple of the user when the image display section 20 is mounted on the head of the user. In a case where the detected blood pressure of the user is a lower limit value or lower and an upper limit value or higher from the blood pressure stored in the storage unit 120 in advance, advice, "Blood pressure value is abnormal. Please go to hospital", may be given to the user. Furthermore, the blood pressure sensor is not limited to the piezoelectric type, and may be a sensor which detects reflected light emitted by an LED and then reflected by the blood of the user. Moreover, the detected biological information of the user is not limited to the blood pressure and may have various modifications. For example, the biological information may be a respiration rate or a body temperature of the user. In addition, in a case where the number of blinks of the user per unit time is reduced when an infrared sensor detects opening and closing of the eyelids of the user or an eye image capturing camera captures an image of the vicinity of the eyes of the user, it may be judged that a physical condition of the user is abnormal, and advice on the abnormality may be given to the user.

Further, in the second embodiment, as illustrated in FIG. 10, when an external temperature corresponds to the preset condition, displaying of the text image TX11 of advice and outputting of the sound of advice are performed, but information regarding control of the head mounted display 100b for recognition by the user is not limited thereto and may have various modifications. For example, in a case where the operation unit 135 receives a faulty operation, information that "a correct operation has not been performed", "there is a risk of failure in the operation unit 135", or the like, may be recognized by the user. Furthermore, in a case where the nine-axis sensor 66 detects acceleration of a threshold value or higher in the image display section 20, information that "there is a risk of damage", "there is a concern that the connector is unfastened", or the like may be recognized by the user. Moreover, in a case where periodic shaking is detected, information informing of the occurrence of the earthquake may be recognized by the user. In addition, in a case where the attachment of water drops of a predetermined amount or more to the image display section 20 is detected, there is a concern that the image display section 20 generates heat, and thus information suggesting removal of the image display section 20 may be recognized by the user.

C7. Modification Example 7

Figure 12A:
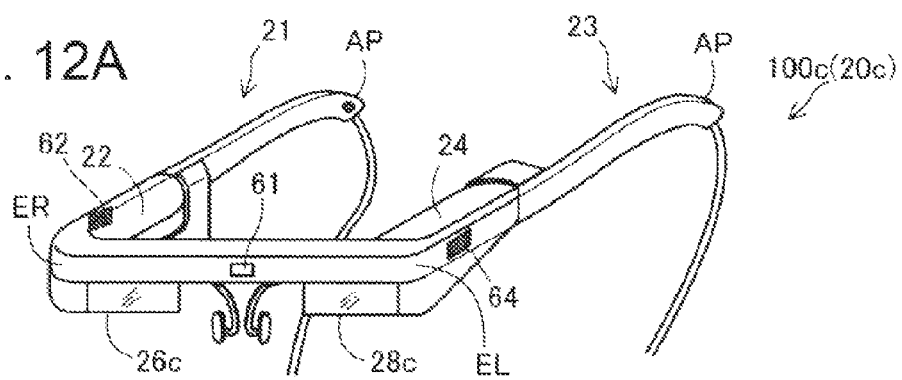
FIGS. 12A and 12B are diagrams illustrating exterior configurations of head mounted displays in a modification example.
Figure 12B:
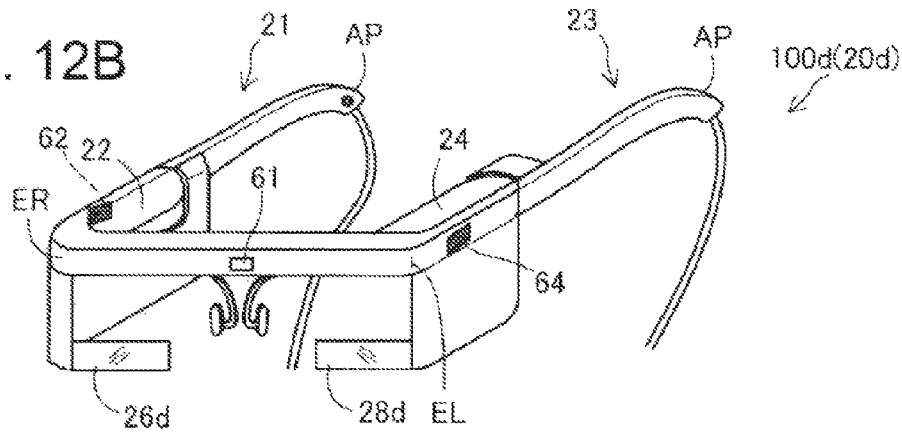

FIGS. 12A and 12B are diagrams illustrating exterior configurations of head mounted displays in a modification example. In a case of an example of FIG. 12A, a difference from the head mounted display 100 illustrated in FIG. 1 is that an image display section 20c includes a right optical image display unit 26c instead of the right optical image display unit 26 and a left optical image display unit 28c instead of the left optical image display unit 28. The right optical image display unit 26c is formed to be smaller than the optical member of the above-described embodiments, and is disposed on the obliquely upper side of the right eye of the user when a head mounted display 100c is mounted. Similarly, the left optical image display unit 28c is formed to be smaller than the optical member of the above-described embodiments, and is disposed on the obliquely upper side of the left eye of the user when the head mounted display 100c is mounted. In a case of an example of FIG. 12B, a difference from the head mounted display 100 illustrated in FIG. 1 is that an image display section 20d includes a right optical image display unit 26d instead of the right optical image display unit 26 and a left optical image display unit 28d instead of the left optical image display unit 28. The right optical image display unit 26d is formed to be smaller than the optical member of the above-described embodiments, and is disposed on the obliquely lower side of the right eye of the user when a head mounted display is mounted. Similarly, the left optical image display unit 28d is formed to be smaller than the optical member of the above-described embodiments, and is disposed on the obliquely lower side of the left eye of the user when the head mounted display is mounted. As above, the optical image display units have only to be disposed near the eyes of the user. Any size of the optical member forming the optical image display units may be used, and the head mounted display 100 may be implemented in an aspect in which the optical image display units cover only a part of the eyes of the user; in other words, the optical image display units do not completely cover the eyes of the user.

C8. Modification Example 8

Further, as an image display section, instead of the image display section 20 which is worn as glasses, other types of image display sections such as an image display section which is worn as, for example, a cap, may be employed. Moreover, in the above-described embodiments, the LCD and the light source are used as a configuration of generating image light, but, alternatively, other display elements such as an organic EL display may be employed. In addition, in the above-described embodiments, the nine-axis sensor 66 is used as a sensor detecting a motion of the head of the user, but, alternatively, a sensor constituted by one or two of an acceleration sensor, an angular velocity sensor, and a geomagnetism sensor may be used. Further, in the above-described embodiments, the head mounted display 100 is of a binocular optical transmission type, but the invention is also applicable to head mounted displays of other types such as, for example, a video transmission type or a monocular type.

In addition, in the above-described embodiments, the head mounted display 100 may guide image light representing the same image to the left and right eyes of the user so that the user visually recognizes two-dimensional images, and may guide image light representing different images to the left and right eyes of the user so that the user visually recognizes three-dimensional images.

Further, in the above-described embodiments, some of the constituent elements realized in hardware may be realized in software, and, conversely, some of the configurations realized in software may be realized in hardware. For example, in the above-described embodiments, the image processing unit 160 or the sound processing unit 170 is realized by the CPU 140 reading and executing a computer program, but these function units may be realized by a hardware circuit.

In addition, when some or all of the functions of the invention are realized in software, the software (computer program) may be provided in a form in which the software is stored in a computer readable recording medium. In the invention, the "computer readable recording medium" is not limited to a portable recording medium such as a flexible disk or a CD-ROM, and also includes internal storage devices of a computer such as a variety of RAMs or ROMs, and an external storage device fixed to a computer, such as a hard disk.

In the above-described embodiments, as illustrated in FIGS. 1 and 2, the control section 10 is provided separately from the image display section 20, but a configuration of the control section 10 and the image display section 20 is not limited thereto and may have various modifications. For example, all of the constituent elements of the control section 10 may be provided in the image display section 20, and some of them may be provided therein. In addition, among the constituent elements provided in the control section 10, only the operation unit 135 may be provided as an independent user interface (UI), and the power supply 130 in the above-described embodiments may be provided independently and may be exchangeable. Further, the constituent elements provided in the control section 10 may be provided in the image display section 20 in an overlapping manner. For example, the CPU 140 illustrated in FIG. 2 may be provided in both of the control section 10 and the image display section 20, and functions of the CPU 140 provided in the control section 10 and a CPU provided in the image display section 20 may be separately divided.

In addition, in the above-described embodiments, the sound processing unit 170 and the conversion unit 185 are provided in the control section 10, but the invention may be realized using a sound processing system which is configured independently as a separate device. For example, control of an output sound or sound processing may be performed by a cloud computing system, a server, a host computer, or a smart phone via a wireless communication line.

Further, in the above-described embodiments, the microphones 62 and 64 are disposed in the image display section 20, and the earphones 32 and 34 are connected to the control section 10, but arrangements of the microphones 62 and 64 and the earphones 32 and 34 may have various modifications. For example, the earphones 32 and 34 may be connected to the head mounted display 100 in the same manner as in a head mounted sound processing device which is mounted on the head. Furthermore, a speaker may be used as a sound output device instead of the earphones 32 and 34. Moreover, the microphones 62 and 64 may not be disposed in the image display section 20, and may be, for example, a sound acquisition device which is provided at a specific position of a facility. In addition, the sound output device may be, for example, a hearing aid which is mounted on the head. In this Modification Example, since the sound output device is mounted on the head of the user, the sound output device hardly deviates from the ears of the user, and thus it is possible to enable the user to stably hear an output sound.

C9. Modification Example 9

For example, the image light generation portion may include an organic electroluminescent (EL) display and an organic EL controller. In addition, for example, LCOS (liquid crystal on silicon; LCoS is a registered trademark) or a digital micromirror device may be used as the image light generation portion instead of an LCD. Further, for example, the invention is applicable to a laser retinal projective head mounted display. In a case of the laser retinal projective head mounted display, an "image formable region" may be defined as an image region recognized by the eyes of the user.

In addition, for example, the head mounted display may be a head mounted display in an aspect in which the optical image display units cover only a part of the eyes of the user; in other words, the optical image display units do not completely cover the eyes of the user. Further, the head mounted display may be a so-called monocular head mounted display.

In addition, the earphone may employ an ear-mounted type or a headband type, or may be omitted. Further, for example, the head mounted display may be configured to be mounted in a vehicle such as an automobile or an airplane. Furthermore, the head mounted display may be configured to be built in a body protection tool such as a helmet.

The invention is not limited to the above-described embodiments or modification examples, and may be implemented using various configurations within the scope without departing from the spirit thereof. For example, the embodiments corresponding to technical features of the respective aspects described in Summary of Invention and the technical features in the modification examples may be appropriately exchanged or combined in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application Nos. 2013-027665, filed Feb. 15, 2013 and 2013-228187, filed Nov. 1, 2013 are expressly incorporated by reference herein.

What is claimed is:

1. An information processing device comprising:
   an image display unit that forms image light representing an image on the basis of image data so as to allow the image light to be visually recognized by the user, and allows external scenery to be transmitted therethrough;
   a sound output unit that outputs an output sound;
   an information acquisition unit that acquires, during the output of the output sound by the sound output unit, an external sound different from the output sound;
   a control unit that adjusts a volume of the output sound when the acquired external sound meets a specified condition; and
   a conversion unit that, based on the external sound meeting the specified condition, converts the external sound into a character image which indicates the external sound by text.

2. The information processing device according to claim 1, wherein the control unit causes the image display unit to form character image light which is the image light representing the character image.

3. The information processing device according to claim 2, wherein the control unit sets a size of the character image light which the image display unit allows the user to visually recognize on the basis of the external sound.

4. The information processing device according to claim 2, wherein the control unit causes the image display unit to form the character image light in a part excluding a central part of an image formable region which is a region where the image display unit can form the image light.

5. The information processing device according to claim 2, wherein
the information acquisition unit is provided in a plurality, the plurality of information acquisition units being disposed at different positions,
the information processing device further includes a sound source direction estimation unit that estimates a sound source direction which is a direction from the image display unit to a sound source of the external sound on the basis of the volume of the external sound acquired by one information acquisition unit and the volume of the external sound acquired by another information acquisition unit, and
the control unit causes the image display unit to form the character image light in an image formable region which is a region where the image display unit can form the image light in correlation with the sound source direction.

6. The information processing device according to claim 2, wherein the control unit measures the volume of the external sound, and turns down the volume of the output sound when the measured volume of the external sound changes from a value smaller than a first threshold value to a value equal to or larger than the first threshold value.

7. The information processing device according to claim 2, further comprising:
a specific sound detection unit that detects a specific sound included in the external sound,
wherein the control unit adjusts the volume of the output sound on the basis of the specific sound detected by the specific sound detection unit.

8. The information processing device according to claim 2, further comprising:
a motion detection unit that detects a change in a motion of the head of the user,
wherein the control unit adjusts the volume of the output sound on the basis of the change in a motion of the head of the user, detected by the motion detection unit.

9. The information processing device according to claim 2, wherein the control unit causes the sound output unit to output a sound in which the volume of the external sound is set as the output sound on the basis of a change in the external sound.

10. The information processing device according to claim 2, wherein, when the information acquisition unit acquires a specific person's voice, the control unit changes a frequency of the acquired voice of the specific person, and causes the sound output unit to output the specific person's voice whose frequency is changed and also turns down the volume of sounds other than the specific person's voice.

11. The information processing device according to claim 1, wherein the sound output unit allows the user to hear the output sound in a state in which the sound output unit is mounted on the head of the user.

12. The information processing device according to claim 1, wherein the information acquisition unit acquires specific information that is information related to at least one of temperature, humidity, magnetism, components in the air, and attachment of liquid to the information processing device.

13. The information processing device according to claim 1, further comprising:
an operation unit that receives a predetermined operation as control information,
wherein the control unit controls the information processing device when an operation different from the predetermined operation received by the operation unit is received.

14. The information processing device according to claim 1, wherein
the information acquisition unit acquires acceleration of the information processing device, and
the information acquisition unit acquires specific information that is acceleration of the information processing device which is equal to or higher than a threshold value.

15. The information processing device according to claim 12, wherein the control unit performs control so as to inform the user of the information processing device of information for limiting use of the information processing device.

16. The information processing device according to claim 12, further comprising:
an image display unit that forms image light representing an image on the basis of image data so as to allow the image light to be visually recognized by the user, and allows external scenery to be transmitted therethrough; and
a conversion unit that converts the setting information into a character image which indicates the setting information by text,
wherein the control unit causes the image display unit to form character image light which is the image light representing the character image.

17. A control method for an information processing device which acquires an external sound, the control method comprising:
forming image light representing an image on an image display unit on the basis of image data so as to allow the image light to be visually recognized by the user and so as to allow external scenery to be transmitted therethrough;
outputting an output sound;
acquiring, during the outputting of the output sound, an external sound different from the output sound;
adjusting a volume of the output sound when the acquired external sound meets a specified condition; and
converting, based on the external sound meeting the specified condition, the external sound into a character image which indicates the external sound by text.

18. The information processing device according to claim 1, wherein the specified condition includes at least one of exceeding a specified threshold volume, falling within a specified frequency spectrum, and matching a specific sound.

* * * * *